United States Patent [19]
Dorfman et al.
[11] Patent Number: 4,739,901
[45] Date of Patent: Apr. 26, 1988

[54] APPARATUS FOR USE IN DISPENSING FLUID FROM A CONTAINER

[75] Inventors: Jan L. Dorfman, Littleton, Colo.; William C. Christine, Nazareth, Pa.
[73] Assignee: Adolph Coors Company, Golden, Colo.

[21] Appl. No.: 34,899
[22] Filed: Apr. 6, 1987

Related U.S. Application Data

[63] Continuation-in-part of Ser. No. 736,097, May 20, 1985, abandoned.

[51] Int. Cl.[4] ..................... B67D 1/14; F16K 47/12
[52] U.S. Cl. ..................... 222/1; 137/614.11; 222/5; 222/83; 222/153; 222/386.5; 222/396; 222/397; 222/399; 222/506; 222/509; 222/564; 251/126
[58] Field of Search ..................... 222/1, 3, 5, 80–83, 222/153, 386.5, , 396, 397, 399, 501, 505, 506, 509, 511, 512, 514, 518, 522, 547, 564; 251/89, 120, 126, 237, 262, 263, 335.1; 137/614.11, 614.18, 318; 138/40, 42

[56] References Cited

U.S. PATENT DOCUMENTS

| | | | |
|---|---|---|---|
| 2,185,267 | 1/1940 | Rice | 251/126 X |
| 3,080,093 | 3/1963 | Wilson | 222/386.5 X |
| 3,096,000 | 7/1963 | Staley | 222/1 |
| 3,195,855 | 7/1965 | Bauerlein | 251/126 X |
| 3,244,326 | 4/1966 | Bull, Jr. | 222/61 |
| 3,333,735 | 8/1967 | Odasso | 222/82 X |
| 3,339,802 | 9/1967 | Weiner et al. | 222/82 |
| 3,612,354 | 10/1971 | Sitton et al. | 222/80 |
| 4,078,578 | 3/1978 | Buchholz | 137/614.11 X |
| 4,319,697 | 3/1982 | De Barth | 222/80 |
| 4,351,455 | 9/1982 | Bond | 222/522 X |
| 4,353,488 | 10/1982 | Schneiter et al. | 222/501 |
| 4,380,310 | 4/1983 | Schneiter et al. | 222/501 |

*Primary Examiner*—Joseph J. Rolla
*Assistant Examiner*—Kevin P. Shaver
*Attorney, Agent, or Firm*—Klaas & Law

[57] ABSTRACT

Dispensing apparatus is attached to a container filled with a fluid and shipped with the container wherein during shipment the dispensing apparatus has two separate seals comprising an operable valve for opening and closing a first passageway, and a sealing member for closing a second passageway and the dispensing apparatus is locked in a closed position. A locking member is provided for preventing accidental movement of the dispensing apparatus and also to provide positive identification that the container has not been tampered with. A self generating pressure applying expandable pouch is located within the container to apply a substantially constant pressure on the fluid so that the fluid may be dispensed from the container. When it is desired to withdraw portions of the fluid from the container, the dispensing apparatus is unlocked and a handle on the dispensing apparatus is moved to an open position to open both seals so that the fluid may flow through the first and second passageways and be withdrawn from the container through a nozzle. The sealing member for the second passageway is locked in the open position so that fluid may be withdrawn from the container as desired. After the fluid has been substantially completely dispensed from the container, a puncture plug is actuated to pierce the expanded pouch so that the pressure may be removed from the expanded pouch and from the container through the dispensing apparatus.

34 Claims, 11 Drawing Sheets

APPARATUS FOR USE IN DISPENSING FLUID FROM A CONTAINER

This application is a continuation-in-part of U.S. patent application Ser. No. 736,097 filed May 20, 1985, now abanonded.

FIELD OF THE INVENTION

This invention relates generally to the marketing of various types of fluids wherein the fluid is contained in a container and the fluid is dispensed from the container without exposing the fluid in the container to the atmosphere and is more particularly directed to containers of this nature wherein the fluid contained in the container is a beverage, such as beer, soft drinks and sparkling wines.

BACKGROUND OF THE INVENTION

In the marketing of fluids, particularly in the marketing of consumable beverages, it has always been desirable to package the beverages so that they may be readily distributed to the market place and at the same time preserve their natural qualities, such as flavor and carbonation levels, until opened to be consumed. While this type of marketing has been successful in the marketing of beverages in the conventional twelve fluid ounce containers, difficulties have been encountered in maintaining the product qualities of beverages packaged in larger containers once they have been initially opened. Recently, soft drink manufacturers have been marketing beverages in containers having fluid capacities of two or three liters. However, in some cases in order to preserve carbonation after the container has been opened, it is necessary to provide excess carbonation at the time the product is packaged. The equivalent internal pressures generated in the container with these carbonation levels can reach 55 psig at room temperature and 110 psig at 110° F. While some success has been obtained, even the use of excess carbonation levels does not prevent product quality degradation if the product is not consumed within a relatively short time after initial opening. In addition, the decay in product quality becomes more apparent as the container approaches empty. The characteristics associated with beer would not permit beer to be marketed under such packaging techniques.

It has been proposed to market quantities of beer in containers holding the equivalent of a case of beer, twentyfour twelve ounce bottles. Among other considerations, two basic problems are associated with this marketing concept, i.e., the necessity for maintaining the beer under a desired pressure as it is partially dispensed and dispensing apparatus for protecting the beer during shipment and storage and for permitting dispensing in partial increments without degradation thereof. This invention provides dispensing apparatus suitable for this marketing concept.

BRIEF SUMMARY OF THE INVENTION

This invention provides apparatus for use in dispensing fluid from a container so that the fluid may be fully or partially dispensed from the container without exposing the fluid in the container to any deleterious conditions such as those discussed above with conventional packaging techniques. The invention is particularly directed to means for permitting the partial dispensing of portions of the fluid out of the container without substantially degrading the quality of the fluid remaining in the container. Means are also provided for ensuring the quality of the fluid being dispensed from the container. In the preferred embodiment of the invention, the fluid is a beverage and in particular, the fluid is beer.

In the preferred embodiment of the invention, the fluid in the container is maintained at all times under a pressure sufficient to maintain carbonation levels and tending to force the fluid out of the container. Means are provided for maintaining the pressure on the fluid in the container within a desired range of pressures throughout the shelf life and dispensing cycle until the fluid is dispensed from the container and to ensure that substantially all of the fluid is dispensed from the container. Such means can comprise a specially designed pouch of the type marketed by Grow Group, Inc. under the trade designation GrowPak. Pressure removing means are provided for removing the pressure from within the pouch after substantially all of the fluid has been removed from the container. A more preferred embodiment of means for maintaining a desired pressure in the container is described in U.S. patent application Ser. No. 034,900, filed 4/6/87, by Jan L. Dorfman and Larry M. Dugan for A Self-Generating Pressure Applying Means For A Disposable Container which description is incorporated herein by reference thereto.

In the presently preferred embodiment of the invention, the dispensing means include nozzle means through which portions of the fluid may be withdrawn from the container means with first wall means forming a first passageway in the dispensing means and having a portion thereof in fluid communication with the nozzle means. Valve means are provided for opening and closing the first passageway and are normally held in a closed position by resilient means. Second wall means form a second passageway in the dispensing means extending between the valve means and the interior of the container means and are provided with sealing means for closing the second passageway. Movable means are provided for moving both the valve means and the sealing means in one direction to an open position to open the first and second passageways so that fluid may flow through the first and second passageways and be withdrawn from the container means through the nozzle means. Retaining means are provided for retaining the sealing means in the open position while permitting normal operation of the valve means so that portions of the fluid can be periodically dispensed through the valve means and the nozzle means until substantially all of the fluid has been dispensed from the container means. The movable means for moving the valve means and the sealing means in one direction to open the first and second passageways is maintained and locked in a closed position during shipment and commercial storage so that there is in effect a double seal until it is desired to use the dispensing means for the first time to dispense fluid from the container means. The various parts which are assembled to form the dispensing means are made in a conventional integral molding operation using a plastic material since plastic is well established for use involving contact with foods and beverages. The preferred plastic material is polypropylene.

When substantially all of the fluid has been removed from the container, the expandable pouch will be in contact with the inner surfaces of the walls of the container and will be under considerable pressure, such as about 17.72 psi if the fluid that was in the container was beer. In the presently preferred embodiment of this invention, the container and dispensing means are disposable so that it is desirable to remove the pressure from within the expanded pouch prior to its disposal. This invention provides a pressure removing means for removing the pressure from the expanded pouch. In a preferred embodiment, the pressure removing means comprises a puncture plug which is a part of the dispensing means. A rotatable stop means prevents movement of the puncture plug until it is desired to remove the pressure. At that time, the rotatable stop means is rotated so that the puncture plug may be moved to pierce the expanded pouch and release the gas pressure through the dispensing means. Locking means are provided to retain the puncture plug in the pressure removing position.

BRIEF DESCRIPTION OF THE DRAWINGS

Illustrative embodiments of the invention, including the presently preferred embodiment, are shown in the accompanying drawings in which.

DETAILED DESCRIPTION OF THE INVENTION

Figure 1:
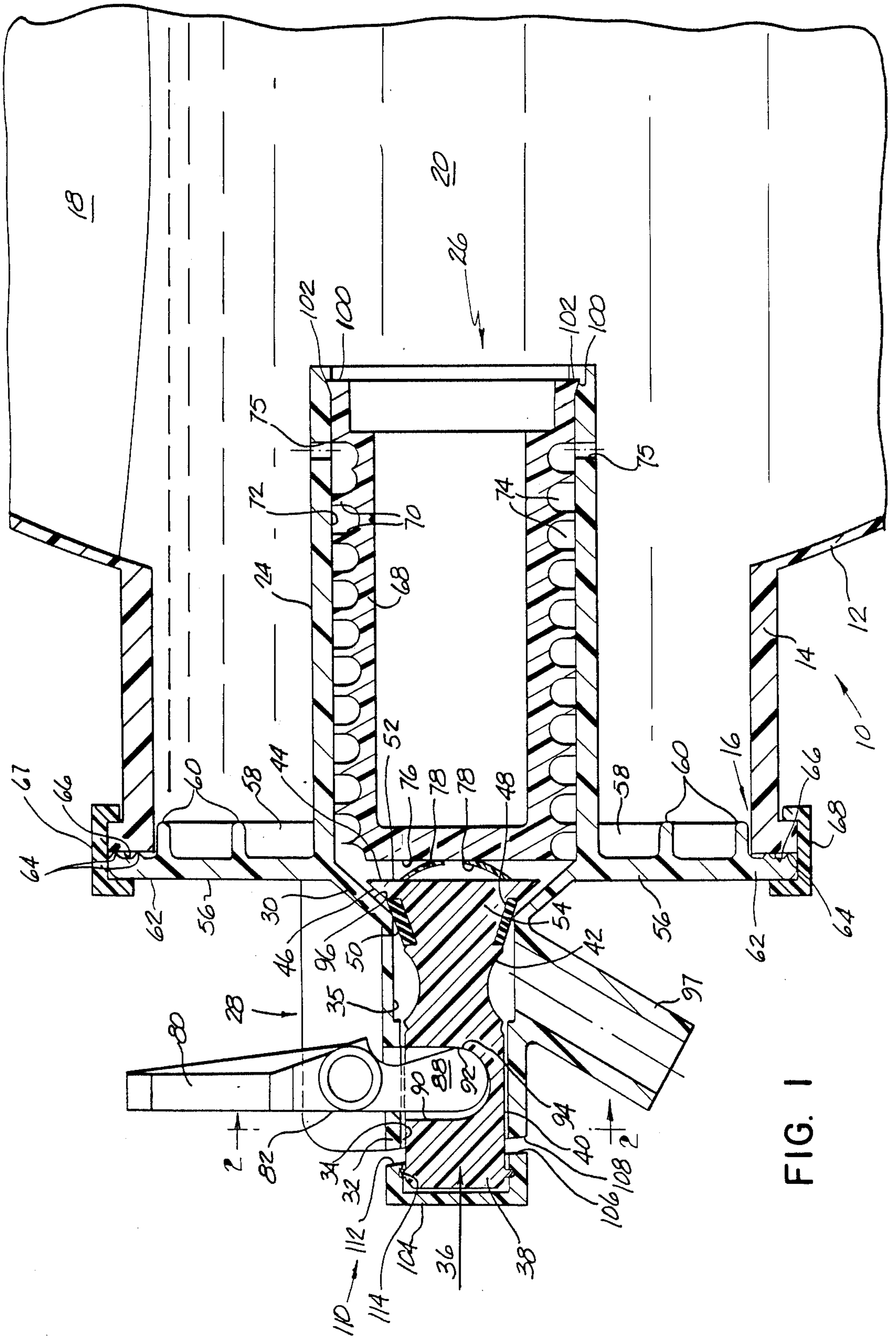
FIG. 1 is a view with parts in section of one embodiment of the dispensing means according to this invention and a portion of the container means.

One embodiment of the present invention is illustrated generally in FIG. 1 and comprises a disposable package comprising a blown hollow integral plastic container means 10, such as a container, bottle, vessel or other similar article, having a body portion 12 and a neck portion 14 defining an opening 16. A pressure pouch 18 which is designed to expand according to a set program as the fluid is dispensed, is inserted into the container means 10 and the container 10 is filled with a suitable fluid 20 such as a beverage which preferably is beer. If desired, the container means 10 may be filled first and then the pressure pouch 18 is inserted. As the pouch 18 expands, it provides the necessary forces to facilitate removal of the beer from the container means in any orientation of the container means and fill the headspace to maintain proper carbonation levels and/or pressure in the container means. If necessary, a flexible hollow flow tube or similar device (not shown) may be positioned in the container means to ensure that any fluid trapped between the pouch and the wall of the container means is dispensed therefrom.

Figure 11:
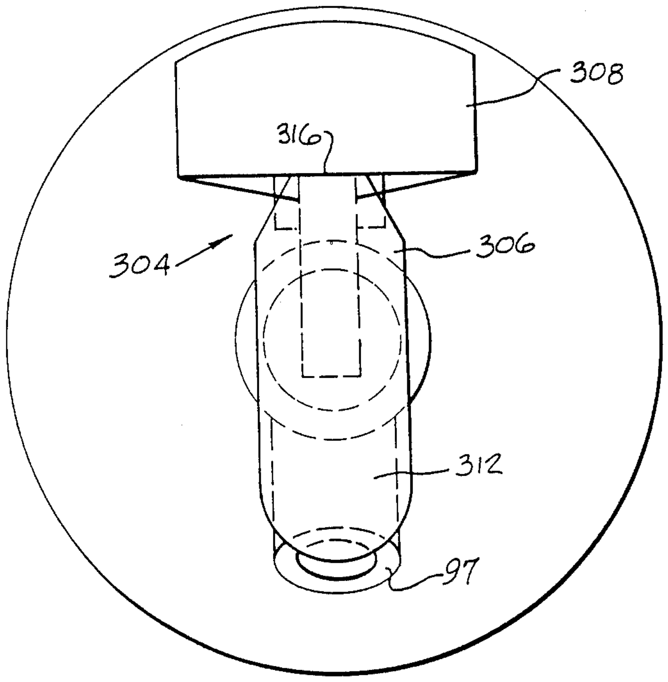
FIG. 11 is a front end view of FIG. 9.

The embodiment of a dispensing means illustrated in FIGS. 1–4 and comprises a hollow annular housing 24 having an open end 26 at one end thereof and fluid flow control means 28 at the other end. The fluid flow control means 28 comprises an integral hollow conical section 30 extending from the housing 24 with an integral hollow generally annular member 32 extending from the conical section 30. The annular member 32 has a first inner generally cylindrical surface 34 and a second inner generally cylindrical surface 35 having an inner diameter greater than the inner diameter of the first generally cylindrical surface 34. A rod 36 is mounted in the member 32 for reciprocal movement therein and has a first section 38 having a generally cylindrical surface 40 in sealing but slidable contact with the first generally cylindrical surface 34. If desired, a groove (not shown) may be formed in the first section 38 with a conventional O-ring gasket, seated in the groove to form a fluid tight seal between the first inner generally cylindrical surface 34 and the first section 38. Spaced inwardly from the first section 38, the rod 36 is provided with an arcuate annular recess 42 so as to form an annular space between the second inner generally cylindrical surface 35 and the recess 42. Between the recess 42 and the rod's inner extremity 44, the rod 36 is provided with a generally tapering outer surface 46 having an annular recess 48 formed therein. A sealing gasket 50 is seated in the recess 48. The bottom of the rod 36 comprises a generally flat surface 52. An integral annular flange like member 56 projects outwardly from the housing 24 and has a rim 58 extending in a direction toward the open end 26. A plurality of ribs 60 provide reinforcement to the rim 58. As illustrated in FIG. 11, the rim 58 is loosely fitted into the neck 14 of the container 10. An integral annular portion 62 extends outwardly from the flange like member 56 and is provided with sealing means 64 in contact with the surface 66 on the neck 14 of the container 10. Annular clamping means 67 are used to retain the assembly and ensure sealing engagement between the sealing means 64 and the surface 66.

A flow restrictor 68 is mounted in the housing 24 and is provided with a projecting spiral rib 70 in contact with the inner surface 72 of the housing 24 so as to form a spiral passageway 74 for the flow of fluid. The housing 24 is provided with a plurality of openings 75 so that fluid may flow from within the container 10 through the openings 75 into the spiral passageway 72. The flow restrictor has a flat end surface 76 spaced a short distance away from flat surface 52. Resilient means 78 are positioned between the flat surfaces 52 and 76 and are resiliently urged against the flat surface 76. In the preferred embodiment, the resilient means 78 comprise two leaf spring members integrally molded with the rod 36 and in contact with the flat surface 76. If desired, the resilient means could be integral with the flow restrictor 68 and in contact with the flat surface 52.

The spiral passageway 74 functions to reduce the pressure of the fluid as it flows through the passageway 74 and into the space between the flat end surface 76 of the flow restrictor 68, the flat surface 52 and the conical section 30. The length and cross-sectional area of the spiral passageway 74 will vary in accordance with the type of fluid, such as a beverage, in the container means 10 and the pressure being developed within the container means 10 by the pressure pouch 18.

Figure 2:
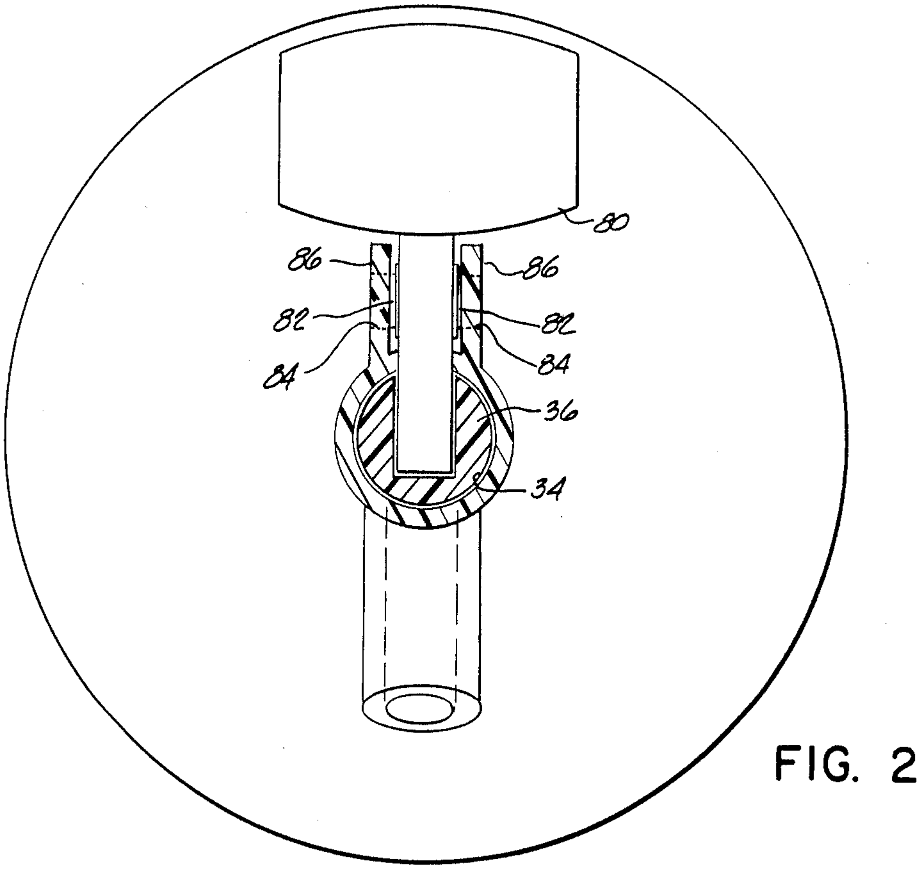
FIG. 2 is a cross-sectional view taken on the line 2—2 of FIG. 1.

A handle means is illustrated in FIGS. 1 and 2 and comprises a handle 80 rotatably mounted by a pivot means 82 seated in opening 84 in blocks 86 extending upwardly from the annular member 32. The lower portion 88 of the handle 80 is positioned in a cavity 90 in the rod 36 and has a cam surface 92 adapted to contact the wall 94 of the cavity 90. In the closed position with the handle 80 in an upright vertical position, illustrated by the solid lines in FIG. 1, the sealing gasket 50 is in contact with the intersection of the second generally cylindrical surface 35 and the inner surface 96 of the conical section 30 by the force exerted by the resilient means 78. When the handle 80 is moved to the open position (not shown), the cam surface 92 acts against the wall 94 to move the rod 36 against the force exerted by the resilient means 78 to move the sealing member 50 out of engagement with the intersection of the second generally cylindrical surface 35 and the inner surface 96 of the conical section 30. When the handle 80 is in the open position, fluid from within the container 10 will flow through openings 75 into the spiral passageway 74, through the opening between the sealing member 50 and the intersection between the second generally cylindrical surface 35 and the inner surface 96 into the recess 42 and then out through the nozzle 97.

Figure 3:
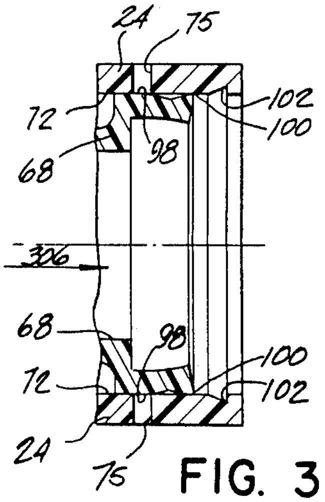
FIG. 3 is a cross-sectional view of a portion of FIG. 1 with parts located for shipping and commercial storage.
Figure 4:
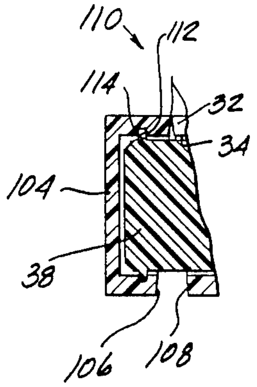
FIG. 4 is a cross-sectional view of a portion of FIG. 1 with a flow modulator thereof located for shipping and commercial storage.

The location of the flow restrictor 68 in the housing 24 during shipment and commercial storage is illustrated in FIG. 3. The housing 24 is provided with a plurality of openings 75. As illustrated in FIG. 3, the flow restrictor 68 is provided with a generally cylindrical outer surface 98 in contact with the inner surface 72 of the housing 24 so as to seal off the openings 75. The flow restrictor 68 is provided with an outwardly extending annular projection 100 and the housing 24 is provided with an annular recess 102 in its inner surface 76. In the position illustrated in FIG. 3, there is no passageway between the fluid in the container and the means 50, 35, 96 and 42 for supplying fluid to the nozzle 24 so that no fluid may flow from within the container to such means 50, 35, 96 and 42. Movement of the flow restrictor 68 from the position illustrated in FIG. 3 is prevented by a flow modulator 104, illustrated in FIG. 4, which is provided with a cam surface 106 opposite to a cam surface 108 on the annular member 32 and which can be positioned to prevent movement of the rod 36. The flow modulator 104 is mounted on the end of the first section 38 of the rod 36 by means 110 which allow the actuator to be rotated but prevented from movement in an axial direction. The means 110 comprises a groove 112 in the modulator 104 and an annular rib 114 on the first section 38. The rib 114 is dimensioned to allow the modulator to be pushed over it and snapped into the illustrated position. The position of the modulator 104 during shipping and commercial storage is illustrated in FIG. 4 wherein the greatest extent of the cam surface 106 is located opposite to and in contact with the greatest extent of the cam surface 108. In some instances, a positive mechanical stop, such as a detent means, may be used to hold the flow modulator 104 in the position illustrated in FIG. 4 so that an extra positive force is required to move the flow modulator to an open position. When it is desired to move the flow restrictor 68 into an operable location, the flow modulator 104 is rotated so as to place the least extent of the cam surface 106 opposite to but spaced from the cam surface 108. This permits the handle 80 to be rotated which functions to move the rod 36 toward the flow restrictor 68 and to move the flow restrictor 68 in the direction of arrow 116 until the annular projection 100 snaps into the annular recess 102 and the flow restrictor 68 is locked in position. As illustrated in FIG. 1, the flow restrictor 68 has been moved into locked position with the openings 75 aligned with the spiral passageway 74 so that fluid may flow through the openings 75 into the spiral passageway 74 and the handle 80 has been returned to its upright closed position.

In most instances, it is most convenient in dispensing fluid from the container, to be able to move the handle 80 between a fully opened and a fully closed position. When the fluid in the container is a carbonated beverage, particularly if the beverage is beer, moving the handle to a fully opened position may produce some undesired effects such as too much foam. To compensate for this, the flow modulator 104 may now be rotated to some position between those illustrated in FIGS. 1 and 4 so as to limit the movement of the rod 36 in response to the rotation of the handle 80 to control the size of the opening between the sealing member 50 and the intersection between the second generally cylindrical surface 35 and the inner surface 96 so as to eliminate the undesirable effects and still permit the desirable operation of the handle 80 between a fully opened and a fully closed position.

Figure 5:
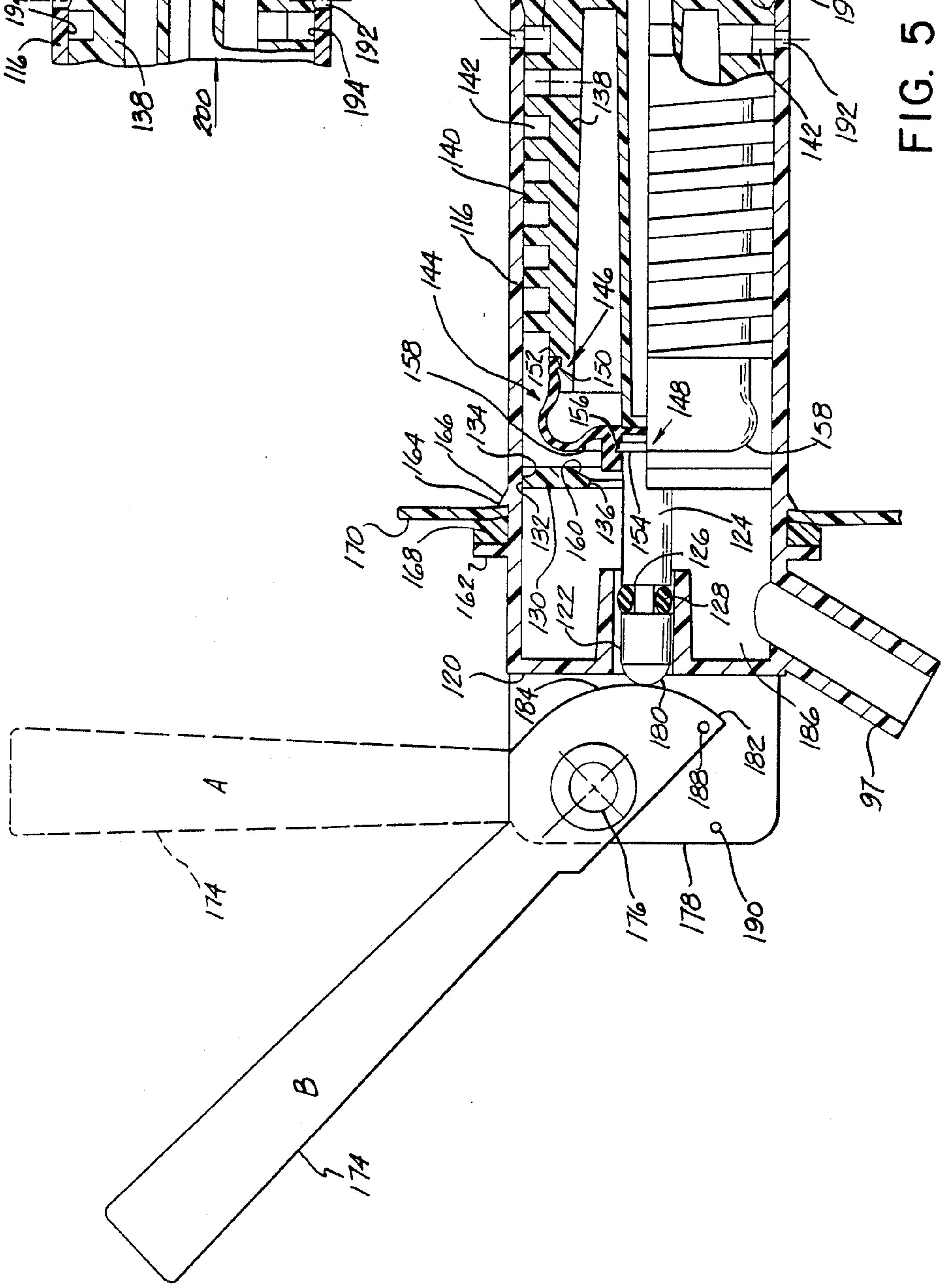
FIG. 5 is a view with parts in section of another embodiment of the dispensing means.

Another type of dispensing means is illustrated in FIG. 5 and comprises a hollow annular housing 116 having an open end 118 at one end thereof and an end wall 120 at the other end. The end wall 120 has a central passageway 122 having a generally cylindrical inner surface. A rod 124 is positioned in the passageway 122 for reciprocal movement therein. An annular groove 126 is formed in the rod 140 and sealing gasket 128 is positioned in the groove so as to form a fluid tight seal between the rod 124 and the passageway 122. A partition 130 is located in the housing 116 with the annular outer surface 132 of the partition 130 in engagement with the inner surface 134 of the housing 116 so as to form a fluid tight seal therebetween. The partition 130 has a central opening 136 having a diameter greater than the diameter of the rod 124 for a purpose to be described below. A flow restrictor 138 is mounted in the housing 116 and is provided with a projecting spiral rib 140 in contact with the inner surface 134 of the housing 116 so as to form a spiral passageway 142 for the flow of fluid. A resilient sealing means 144, made from buna N rubber or a rubber compound, is connected at one end 146 to the flow restrictor 140 and at its other end 148 to the rod 124. As illustrated in FIG. 5, the resilient sealing means 144 is connected to the flow restrictor 138 by a snap fit wherein a projection 150 on the flow restrictor 138 is seated in a recess 152 in the resilient sealing means 144. A similar snap fit connection is provided between the resilient sealing means 144 and the rod 124 with a projection 154 on the rod 124 being seated in a recess 156 in the resilient sealing means 144. An annular sealing surface 158 is formed on the sealing means 144 and is adapted to be moved into and out of sealing engagement with the annular surface 160 surrounding the central opening 136 of the partition 130 as described below.

The housing 116 is provided with an integral outwardly projecting annular flange 162 and an integral outwardly projecting annular rib 164 having an outer tapering surface 166 having its smallest outer diameter closer to the open end 118. A seal washer 168 and a closure means 170 are positioned on the housing 116 between the flange 162 and the rib 164. The seal washer 168 functions to effect a fluid tight seal between the closure means 170 and the housing 116.

The means for reciprocating the rod 124 so as to move the sealing surface 168 into and out of engagement with the annular surface 160 is illustrated in FIG. 5 wherein the dispensing means is shown in an open position. In the closed position (not shown), the force due to the resilient nature of the sealing means 144 moves the sealing surface 158 into sealing engagement with the annular surface 160. The means for moving the rod 124 in the opposite direction to a position illustrated in FIG. 5 comprises a dispenser handle 174 rotatably mounted on a pivot 176 mounted in a pivot block 178. The rod 124 is provided with an arcuate surface 180 that projects outwardly from the end wall 120. The dispenser handle 174 has an arcuate surface 182 adapted to be in contact with the arcuate surface 180 of the rod 124. When the dispenser handle 174 is in a vertical position A, the arcuate surface 180 is in contact with the end 184 of the arcuate surface 182 so that the dispensing means is in a closed position (not shown) with the sealing surface 158 in sealing engagement with the annular surface 160 surrounding the central opening 136. When the dispenser handle 174 has been moved to position B, the arcuate surface 182 has gradually moved over the arcuate surface 180 so as to apply camming forces to the rod 124 to move sealing surface 158 out of engagement with the annular surface 160 and permit the flow of fluid through the spiral passageway 142, out between the space between the rod 124 and the central opening 136, into the chamber 186 and then out through the nozzle 97.

The dispensing means is assembled by sliding the sealing gasket 128, preferably an O-ring, over the rod 124 until it is seated in the groove 126; the rod 124 is then pushed into the sealing means 144 until the projection 154 snaps into the recess 156; the flow restrictor 138 is pushed into the sealing means 144 until the projection 150 snaps into the recess 152 to form a sub-assembly. The partition 130 is then press fitted into the housing 116 and the sub-assembly inserted in the housing 116. The sealing gasket is then moved over the housing 116 and into contact with the flange 162. The housing 116 is then press fitted into the closure 170 which closure 170 is then sealing fitted onto the flange of the container 10 (not shown). An opening 188 is provided in the dispenser handle 174 and an opening 190 is provided in the pivot block 178 so that when the dispenser handle is in the closed position A, a locking pin (not shown) may be inserted through the openings 188 and 190 to prevent movement of the dispenser handle 174. This is particularly important during shipment and commercial storage of the disposable package.

Figure 6:
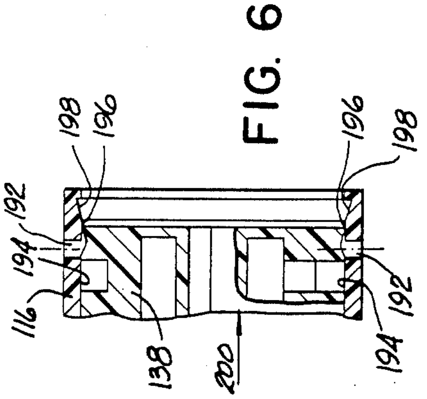
FIG. 6 is a cross-sectional view of a portion of FIG. 5 with parts located for shipping and commercial storage.

The location of the flow restrictor 138 in the housing 116 during shipment and commercial storage is illustrated in FIG. 6. The housing 116 is provided with a plurality of openings 192. As illustrated in FIG. 6, the flow restrictor 138 is provided with a generally cylindrical outer surface 194 in contact with the inner surface 134 of the housing 116 so as to seal off the openings 192. In this position, there is no passageway between the fluid in the container and the means 136 and 158 for supplying fluid to the nozzle 24 so that no fluid may flow from within the container to such means 136 and 158. The flow restrictor 138 is provided with an outwardly extending annular projection 196 and the housing 116 is provided with an annular recess 198 in its inner surface 124. When it is desired to dispense fluid from the container 10, the locking pin (not shown) is removed and the handle 174 is moved from the closed position A to the open position B. The movement of the handle A to the open position B moves the flow restrictor 138 in the direction of arrow 200 until the annular projection 196 snaps into the annular recess 198 and the flow restrictor 138 is locked in position. As illustrated in FIG. 5, when the flow restrictor 138 is in the locked position, the openings 192 are aligned with the spiral passageway 142 so that fluid may flow through the openings 192 into the spiral passageway 142.

Figure 7:
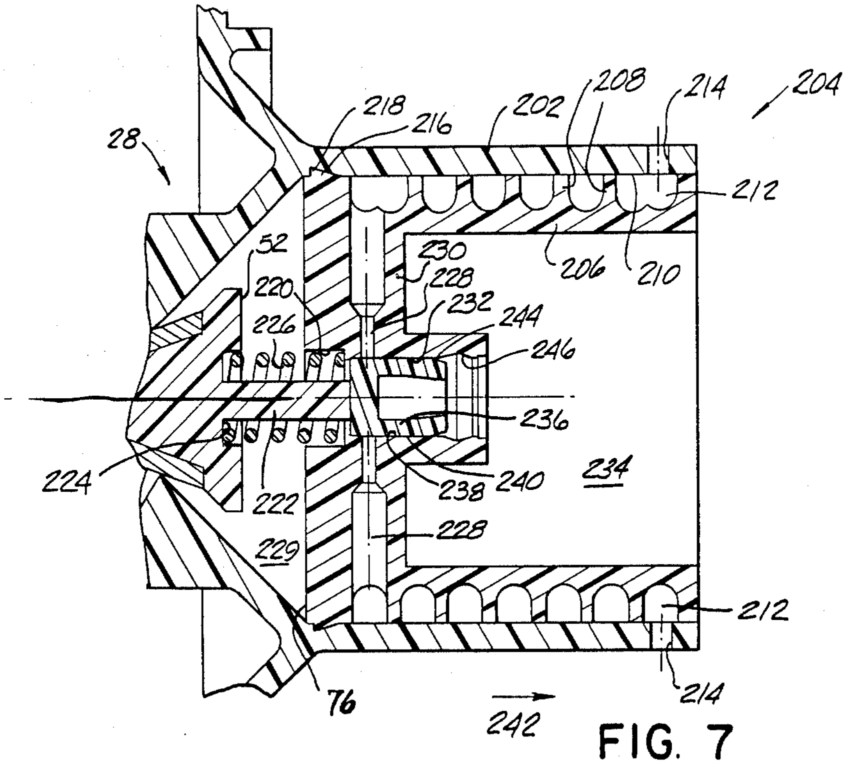
FIG. 7 is a view with parts in section of a portion of another embodiment of the dispensing means with parts located for shipping and commercial storage.
Figure 8:
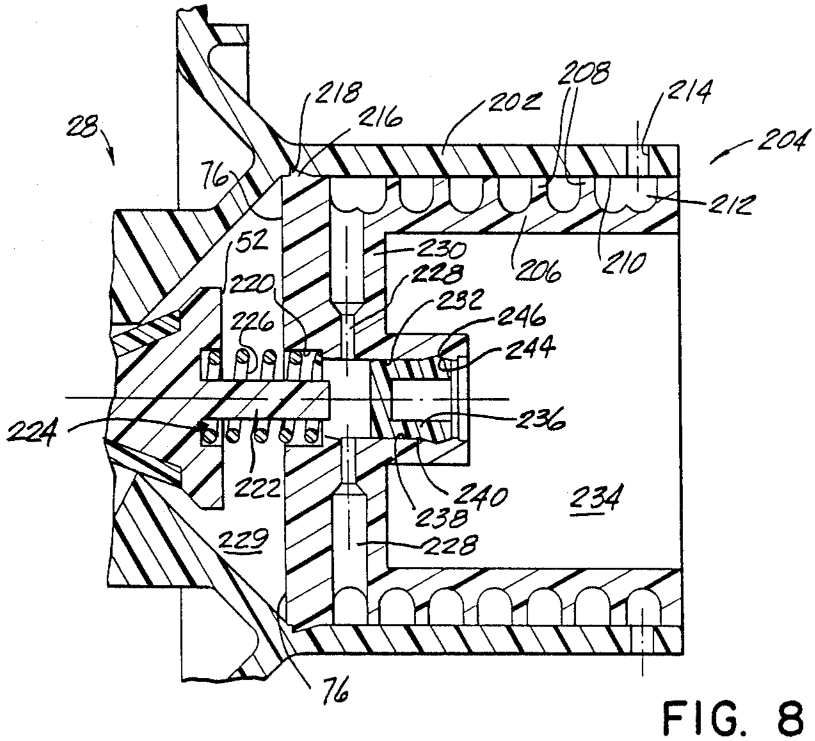
FIG. 8 is a view similar to FIG. 7 with parts located so that fluid may be dispensed from the container means.

Another embodiment of the dispensing means is illustrated in FIGS. 7 and 8 and comprises a hollow annular housing 202 having an open end 204 at one end thereof and fluid flow control means 28 at the other end. Since the dispensing means illustrated in FIG. 6 has the same fluid control means 28 including the handle 80 and the flow modulator 104 and other associated parts as illustrated in FIG. 1, a detailed showing of these parts has been omitted in FIG. 7.

A flow restrictor 206 is mounted in the housing 202 and is provided with a projecting spiral rib 208 in contact with the inner surface 210 of the housing 202 so as to form a spiral passageway 212 for the flow of fluid therethrough. The housing 202 is provided with a plurality of openings 214 so that fluid may flow from within the container 10 through the openings 214 into the spiral passageway 212. An annular projection 216 on the flow restrictor 206 is seated in an annular recess 218 in the housing 202 to hold the flow restrictor 206 in proper relationship within the housing 202. The flow restrictor 206 has a flat end surface 76 having a central cylindrical recess 220. The flat surface 52 in FIG. 7 differs from that in FIG. 1 in that it is provided with a rod 222 projecting therefrom and with an annular recess 224 surrounding the rod 222. A coil spring 226, made from stainless steel, is seated in the recesses 220 and 224 to provide resilient means which function in the same way as the resilient means 78 illustrated in FIG. 1. The flow restrictor 206 is provided with a plurality of radially extending passageways 228 providing fluid communication between the spiral passageway 212 and the central opening 232, as described below.

The means for ensuring that there is no passageway between the fluid in the container and the means for opening and closing the passageway leading to the nozzle until it is desired to use the dispensing means for the first time to dispense fluid from the container in FIGS. 7 and 8 differs from such means illustrated in FIGS. 1 and 3, FIGS. 5 and 6. As illustrated in FIG. 7, the end wall 230 of the flow restrictor 206 is provided with an central opening 232 extending from the recess 220 to the interior 234 of the flow restrictor 206. A plug 236 is mounted in the central opening 232 and has an outer surface 238 in contact with the inner surface 240 of the opening 232 so as to form a fluid tight seal therebetween. During shipping and storage, the plug 236 is located as illustrated in FIG. 7 wherein the outer surface 238 of the plug 236 covers the ends of the radial passageways 228 so that there is no passageway extending between the fluid within the container and the fluid flow control means 28. The pressure of the fluid within the container acts against the plug 236 to urge the plug 236 against the rod 222 to ensure that the outer surface 238 of the plug 236 covers the ends of the passageways 228.

When it is desired to use the dispensing means for the first time, the flow modulator 104 is rotated so as to place the lease extent of the cam surface 106 opposite to but spaced from the cam surface 108. This permits the handle 80 to be rotated which functions to move the rod 222 against the plug 236 to move the plug 236 in the direction of the arrow 242 until the annular projection 244 on the plug 236 snaps into the recess 246 in the end wall 228. The force required to move the plug 236 against the force exerted by the pressure on the fluid in the container is substantially less than the force required to move the flow restrictors 68 of FIG. 1 and 138 of FIG. 5. This is because the cross-sectional area of the plug 236 is substantially less than the cross-sectional areas of the flow restrictors 68 and 138. After the plug 236 has been moved to the position illustrated in FIG. 8, the flow modulator 104 is rotated to the desired intermediate location so that the handle 80 may be moved between a fully opened position and a fully closed position as described above.

Figure 10:
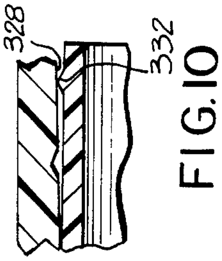
FIG. 10 is a cross-sectional view of a portion of FIG. 9 with parts located so that fluid may be dispensed from the container means.
Figure 9:
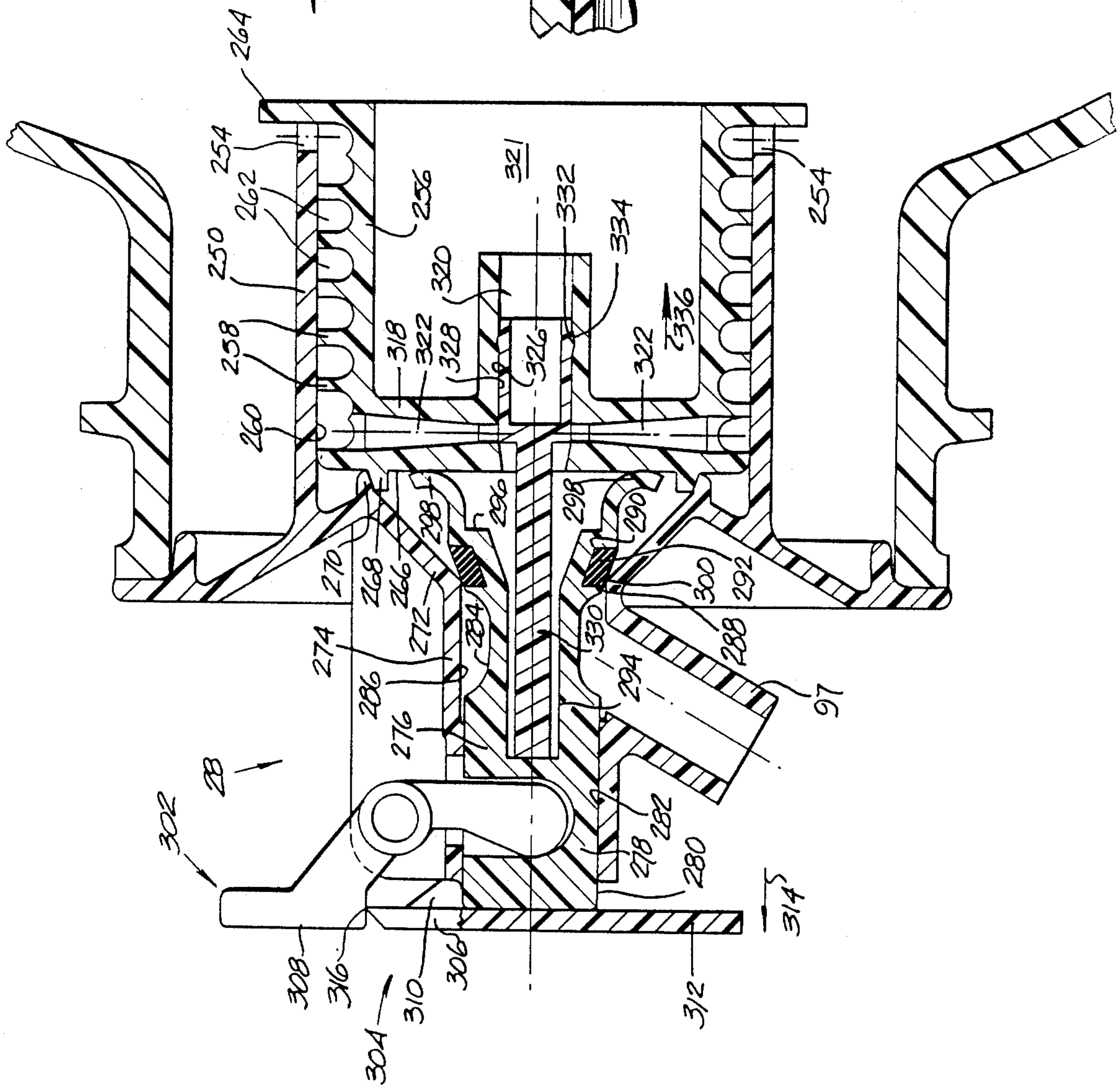
FIG. 9 is a view with parts in section of another embodiment of the dispensing means with parts located for shipping and commercial storage.

Another embodiment of the invention is illustrated in FIGS. 9 and 10 and comprises a hollow annular housing 250 having an open end 252 at one end thereof and fluid flow control means 28 at the other end. A pair of open ended slots 254 are formed adjacent to the open end 252 of the housing 250.

A flow restrictor 256 is mounted in the housing 250 and is provided with a projecting spiral rib 258 in contact with the inner surface 260 of the housing 250 so as to form a spiral passageway 262 for the flow of fluid therethrough. The flow restrictor 256 is provided with a flange 264 which contacts the end of the housing 250 so that fluid may flow from within the container 10 through the slots 254 into the spiral passageway 262. The end surface 266 of the flow restrictor 256 is provided with an annular projecting rib 268 which is located so as to contact and mate with an annular projecting rib 270 so as to form a fluid tight seal therebetween.

The fluid flow control means 28 comprises an integral hollow conical section 272 extending from the housing 250 with an integral hollow generally annular member 274 extending from the conical section 272. A rod 276 is mounted in the member 274 for reciprocal movement therein and has a first section 278 having a generally cylindrical surface 280 in sealing but slidable contact with the generally cylindrical inner surface 282 of the annular member 274. If desired, a groove (not shown) may be formed in the first section 278 with a conventional O-ring gasket, seated in the groove to form a fluid tight seal between the generally cylindrical surface 282 and the first section 278. Spaced inwardly from the first section 278, the rod 276 is provided with an arcuate annular recess 284 so as to form an annular space between the inner generally cylindrical surface 286 and the recess 284. Between the recess 284 and the rod's inner extremity, the rod 276 is provided with a generally tapering outer surface 288 having an annular recess 290 formed therein. A sealing gasket 292, made from a resilient material such as buna N rubber or a rubber compound, is seated in the annular recess 290. The rod 276 has an inner annular cavity 294 formed therein and terminates in an annular rim 296. A pair of leaf springs 298 extend from the annular rim 296 and bear against the surface 266 of the flow restrictor 256. In normal operation, the leaf springs urge the rod 276 to a closed position with the sealing gasket 292 in sealing relationship with the annular portion 300 of the conical section 272.

Handle means 302, similar to the handle means 80 illustrated in FIGS. 1 and 2, are provided. The means for preventing movement of the handle means 302 to move the rod 276 differs from the flow modulator 104 of FIGS. 1 and 2. As illustrated in FIGS. 9 and 10, a locking means 304 comprising a member 306 is integrally formed on the handle 308. The member 306 is provided with a projection 310 extending inwardly toward the flow restrictor 256 and is provided with a mating surface in contact with the top outer surface of rod 276. In the position illustrated in FIGS. 9 and 10, the member 306 prevents rotation of the handle 308 so that the rod 276 cannot be moved toward the flow restrictor. When it is desired to dispense fluid from the container 10 for the first time, the lower portion 312 of the member 306 is grasped and moved axially outwardly in the direction indicated by the arrow 314 so as to break the member 306 away from the handle 308 along the juncture 316. The member 306 also serves as positive identification that the disposable package has not been tampered with.

The end wall 318 of the flow restrictor is provided with a central annular opening 320 extending from the surface 266 and terminating as an open end 321 in the interior of the flow restrictor. A plurality of radially extending passageways 322 are provided in the end wall 318 to provide fluid communication between the spiral passageway 262 and the central opening 320. A plug 324 is movably mounted in the central opening 320 and has an outer surface 326 in contact with the inner surface 328 of the central opening 320 so as to form a fluid tight seal therebetween. During shipping and storage, the plug 324 is located as illustrated in FIG. 9 wherein the outer surface 326 of the plug 324 covers the ends of the radial passageways 322 so that there is no passageway extending between the fluid within the container and the fluid flow control means 28. A member 330 extends from the plug 324 and abuts against an inner surface of the rod 276. The pressure of the fluid within the container acts against the plug 324 to urge the plug 324 against the rod 276 to ensure that the outer surface 326 of the plug 324 covers the ends of the passageways 322. If desired, additional means, such as a projection 332 on the plug 324 seated in a recess 334 in the inner surface 328, may be used to position the plug 324.

When it is desired to use the dispensing means for the first time, the member 306 is rotated so as to break the member 306 away from the handle 308. This permits the handle 308 to be rotated which functions to move the rod 276 against the projection 330 to move the plug 324 in the direction of the arrow 336 until the outer surface 326 moves a distance so as to open the passageways 322 to the central opening 320. The force required to move the plug 324 to an opened position is slightly greater than the force required to move the plug 236 of FIG. 7 to an open position, but is substantially less than the force required to move the flow restrictors 68 and 138 of FIGS. 1 and 5 to the open position. When the plug 324 has been moved to the open position, as illustrated in FIG. 10, the projection 332, because of the natural characteristic of the plastic material to resile, is resiliently urged against the inner surface 328 of the central opening 320 with sufficient force so as to retain the plug 324 in the open position.

Figure 12:
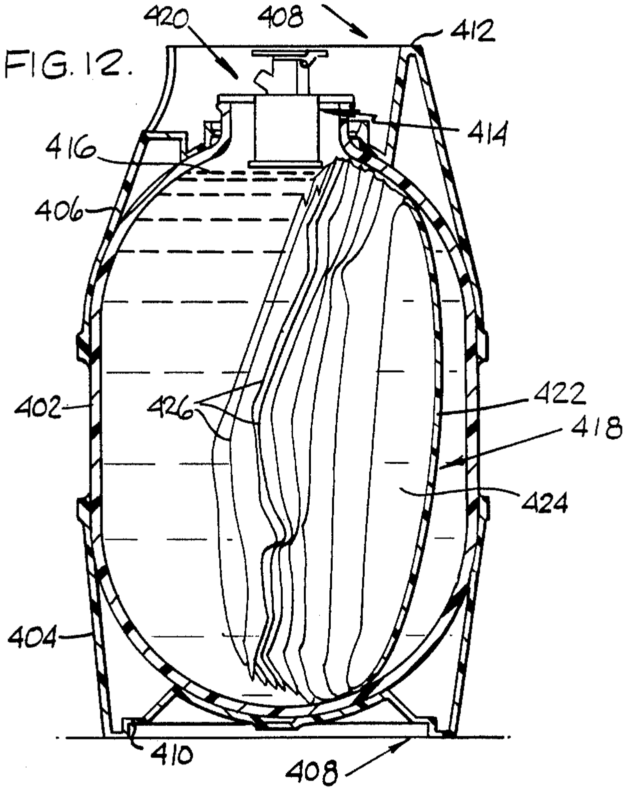
FIG. 12 is a cross-sectional view illustrating a container means and its supporting structure in an upright position for shipping and commercial storage and a partially expanded expandable pouch.
Figure 13:
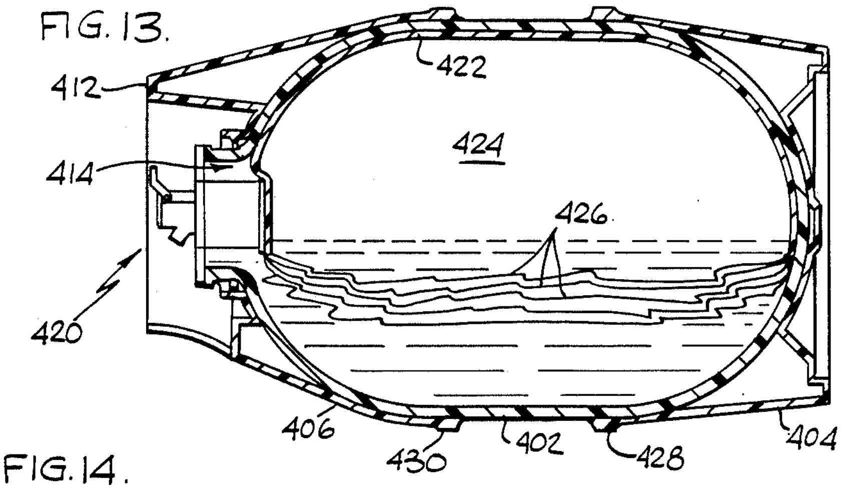
FIG. 13 is a cross-sectional view illustrating a container means and its supporting structure in a dispensing position and after more than half the fluid has been dispensed.
Figure 14:
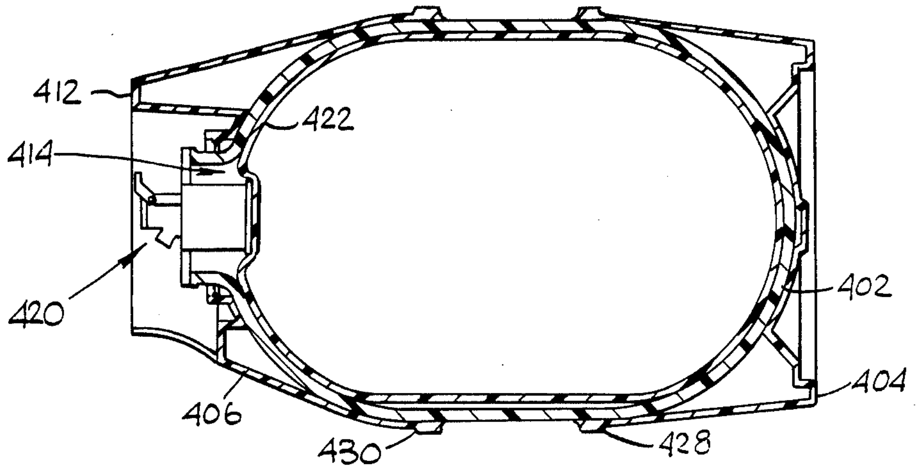
FIG. 14 is a view similar to FIG. 13 but after substantially all the fluid has been dispensed.

The presently preferred disposable package, with which the apparatus of this invention is used, is illustrated in FIGS. 12-14 and comprises a hollow container means 402 integrally molded as one piece using a plastic material such as polyethylene terephthalate (PET), for holding a fluid, such as a beverage to be dispensed therefrom. A first support means 404 is provided and is secured by any desired means to the container means 402. A second support means 406 is provided and is secured by any desired means to the container means 402. The first and second support means 404 and 406 are integrally molded as one piece using a plastic material such as polyethylene and have nesting means 408 so that one container means 402 may be stacked one one top of another container means for shipping and commercial storage. The portion of the nesting means 408 on the first support means 404 comprises a generally planar annular surface 410. The portion of the nesting means 408 on the second support means 406 comprises a generally planar annular edge portion 412. In the nested position, the annular surface 410 is in contact with and supported by the annular edge portion 412. The container means 402 is provided with a relatively large diameter central opening 414 for filling the container means 402 with a fluid 416 and for inserting a pressure applying means 418. A dispensing means 420 is secured to the container means 402 so as to seal the central opening 414.

The pressure applying means 418 comprises an expandable pouch means 422, formed from a fluid impermeable, flexible plastic material, having a first compartment 424 and a plurality of other compartments 426. The first compartment 424 has two components of a two component gas generating means (not shown) contained therein which is actuated prior to insertion of the expandable pouch 422 into the container means 402. The first compartment 424 and the other compartments 426 are formed by rupturable seam means so that as the gas is generated, successive other compartments 426 are opened and expanded. Each of the other compartments 426 contains one of the two components so that gas continues to be generated as the expandable pouch 422 expands. In the shipping and commercial storage upright position illustrated in FIG. 12, the first compartment 424 is at least partially expanded.

In FIG. 13, the container means 402 is being supported in a fluid dispensable position. A generally planar supporting surface 428 is provided on the first supporting means 404 and is aligned with a generally planar supporting surface 430 on the second supporting means 406 for supporting the container on a generally horizontal surface, such as a home refrigerator, and maintaining the container means 402 in such position. The seams of some of the other compartments 426 have ruptured so as to increase the volume of gas under pressure in the expandable pouch means 422. In FIG. 14, the expandable pouch means 422 is substantially fully expanded and is substantially completely in contact with the inner surface of the container means 402 except for the portion defining the central opening 414.

Figure 15:
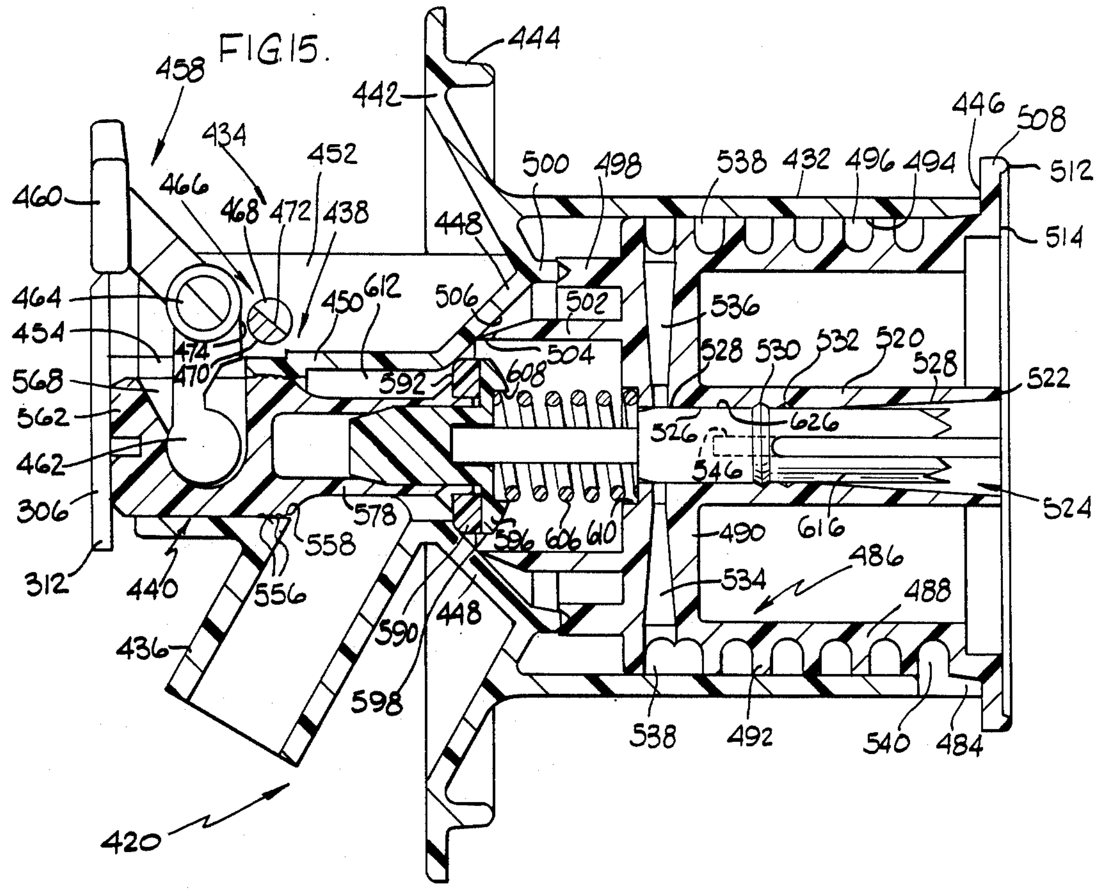
FIG. 15 is a view with parts in section of the presently preferred embodiment of the dispensing means with parts located for shipping and commercial storage.

The presently preferred embodiment of the dispensing means 420 is illustrated in FIG. 15. The first part of the dispensing means 420 is illustrated in FIGS. 15 and 18-20 and comprises a housing 432, a handle supporting means 434, a nozzle 436 and the outer housing 438 of the flow control means 440 integrally formed together. An integral annular flange like member 442 projects outwardly from the housing 432 and has a rim portion 444 extending toward the open end 446 of the housing 432 which rim portion 444 is shaped to mate with the inner surface of the container means 402 forming the central opening 414. The outer housing 438 has a hollow conical section 448 integral with the housing 432 and an integral hollow generally annular member 450 extending axially outwardly from the conical section 448.

Figure 18:
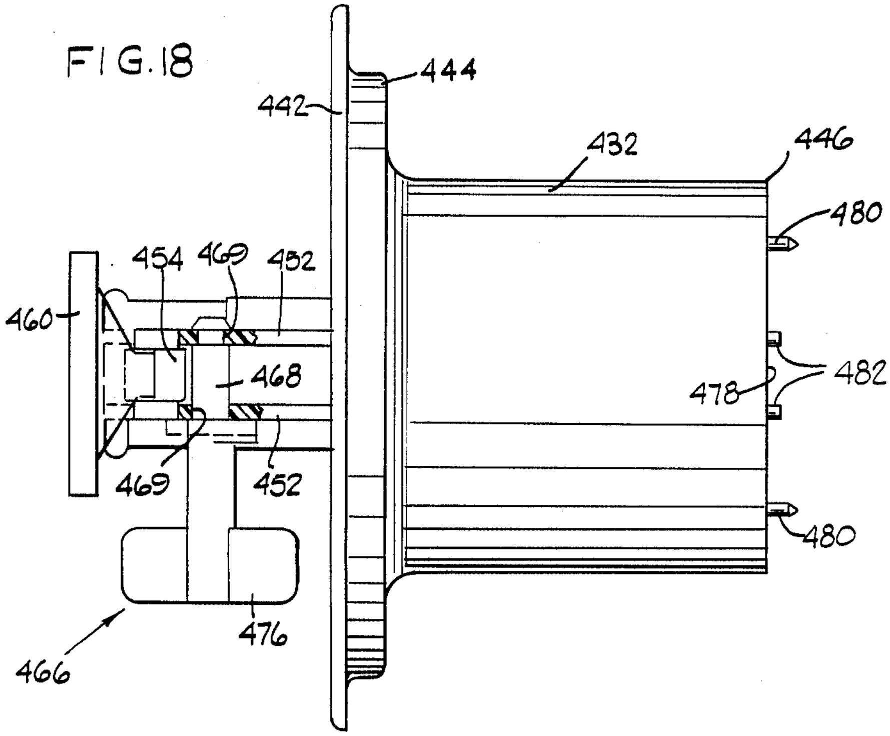
FIG. 18 is a top plan view with parts in section of the handle and housing portions of FIG. 15.

The handle supporting means 434, illustrated in FIGS. 15 and 18, comprise two parallel ribs 452 projecting outwardly from the conical section 448 and the annular member 450. A slot 454 is formed in the annular member 450 adjacent to the open end 456 thereof and between the ribs 452. Handle means 458 having a head portion 460 and a force applying portion 462 are rotatably mounted on the ribs 452 by rotatable means 464 mounted in aligned openings 465 in the ribs 452. Adjustable movement limiting means 466 comprising a stop means 468 are rotatably mounted in aligned openings 469 in the ribs 452. The stop means 468 has an operating portion having a generally circular outer surface 470 for permitting movement of the dispensing means to a dispensing position, as described below, and a puncture permitting portion having a generally planar outer surface 472 for a purpose described below. A surface 474 of the handle means 458 is located so as to contact either the circular outer surface 470 or the planar outer surface 472 to limit movement of the handle means 458. A handle 476 is attached to the stop means 468 for rotating the stop means 468 to the desired outer surface 470 or 472.

Figure 19:
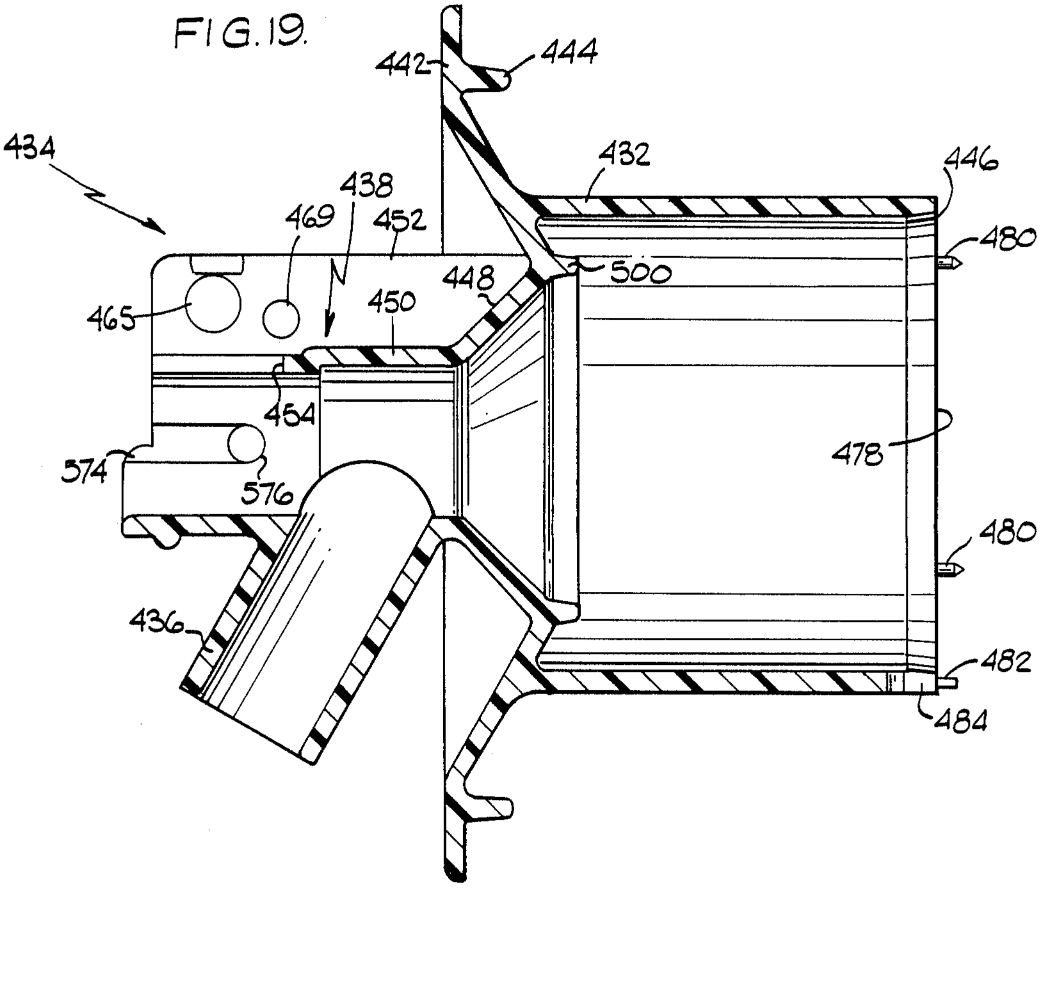
FIG. 19 is a cross-sectional view of a portion of FIG. 18.
Figure 20:
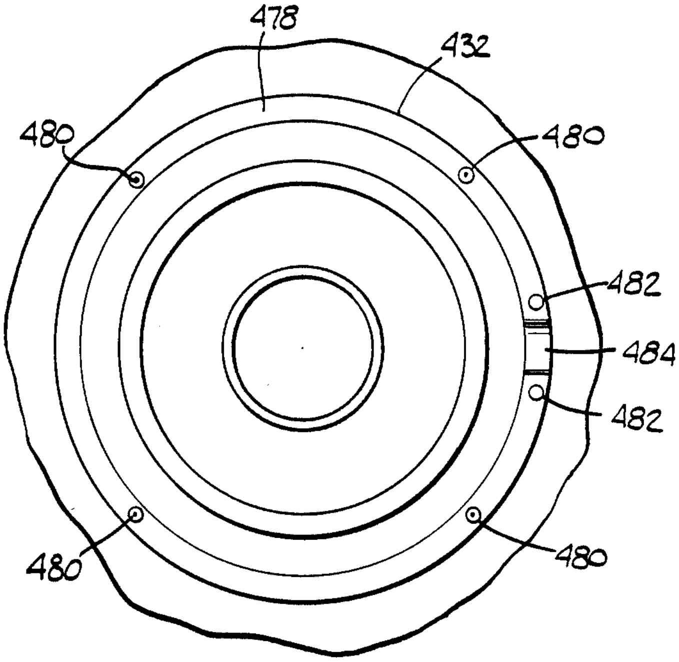
FIG. 20 is an enlarged rear elevational view of a portion of FIG. 18.

The housing 432, illustrated in FIGS. 18–20, has a generally planar annular end surface 478 at its open end 446. A plurality of securing pins 480 and a plurality of locating pins 482 project axially outwardly from the annular end surface 478 for a purpose described below. Also, a housing slot 484 extends axially inwardly from the bottom portion of the annular end surface 478 for a purpose described below.

Figure 21:
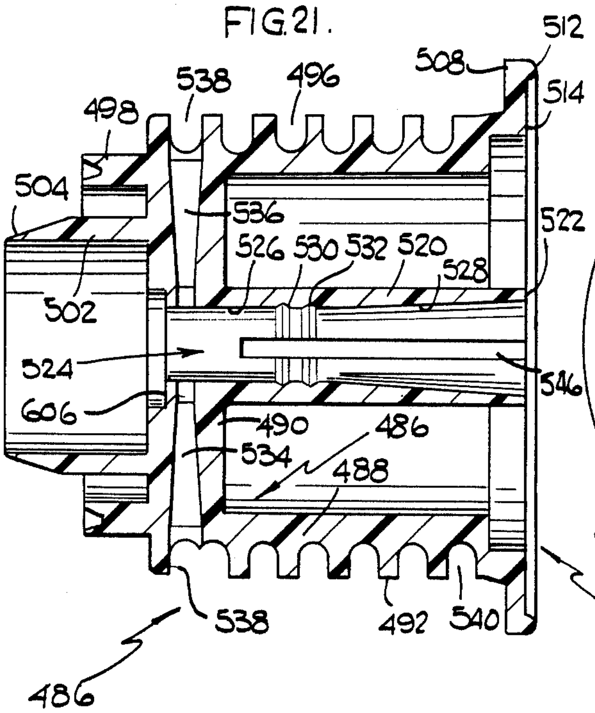
FIG. 21 is a cross-sectional view of the flow restrictor of FIG. 15.
Figure 22:
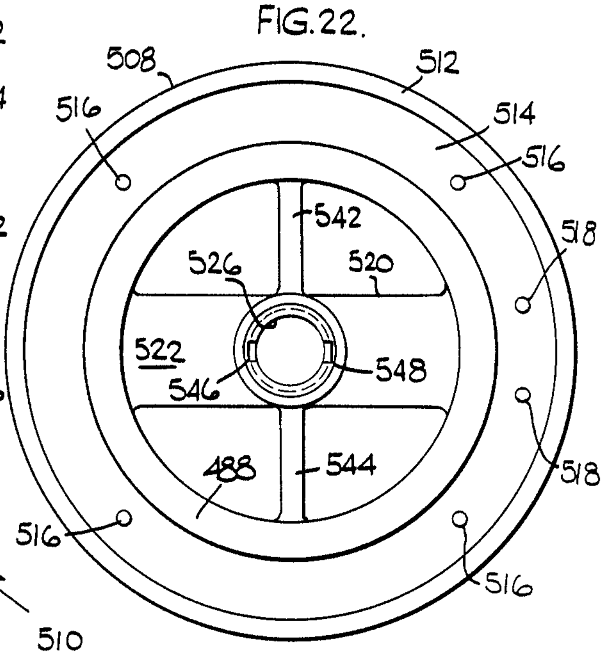
FIG. 22 is a rear elevational view of FIG. 21.
Figure 23:
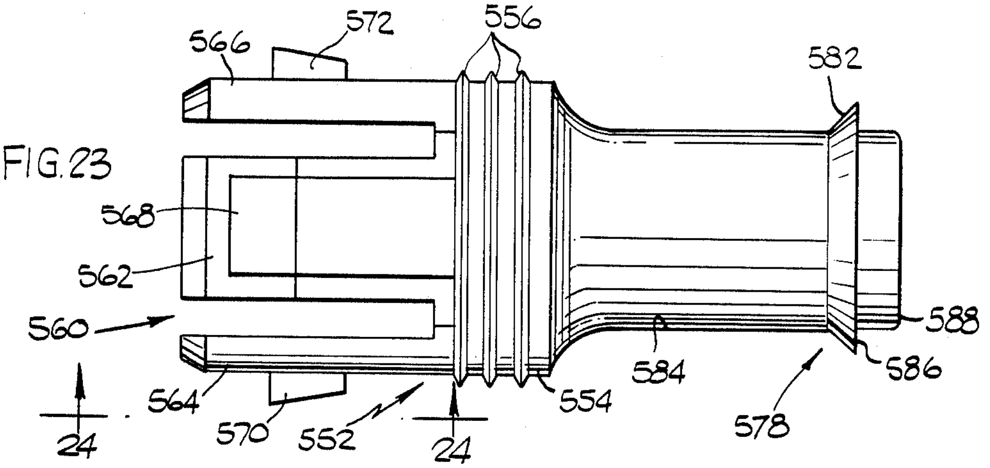
FIG. 23 is a top plan view of the fluid flow control means of FIG. 15.
Figure 24:
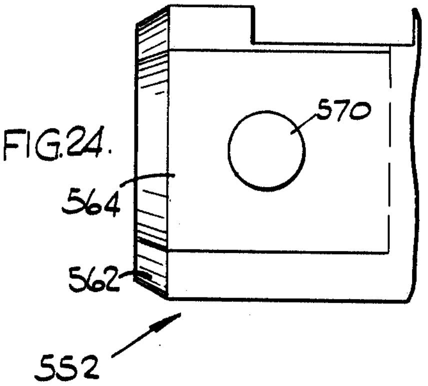
FIG. 24 is a side elevational view of a portion of FIG. 23.
Figure 25:
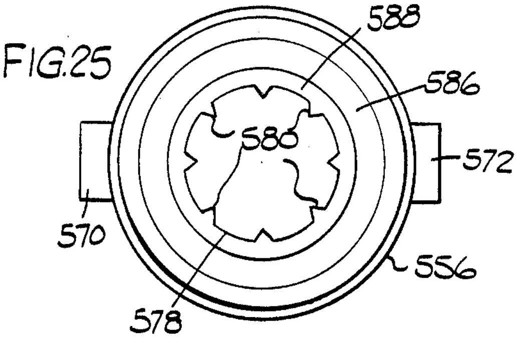
FIG. 25 is a rear elevational view of FIG. 23.

As illustrated in FIGS. 15, 21 and 22, another part of the dispensing means 420 comprises a flow restrictor 486 having an elongated body portion 488 extending in a longitudinal direction and a radially extending end wall 490, mounted within the housing 432. A spiral rib 492 projects radially outwardly from the body portion 488 and is in contact with the inner surface 494 of the housing 432 so as to form a spiral passageway 496 for the flow of fluid therethrough. An annular rib 498 projects in an axially outward direction from the end wall 490 and contacts an annular rib 500 projecting axially inwardly from the hollow conical section 448 so as to position the flow restrictor 486 in the housing 432. Another annular rib 502, having a diameter smaller than the annular rib 498, projects axially outwardly from the end wall 490 and has a feather edge 504 in contact with the inner surface 506 of the hollow conical section 448. The annular rib 502 is dimensioned so that when the flow restrictor 486 is mounted in the housing 432, the inner surface 506 applies a radially inwardly directed force on the feathered edge 504 so as to form a fluid tight seal therebetween.

A flange like portion 508 projects radially outwardly from the body portion 488 at the open end 510 thereof. The flange like portion 508 has an annular end surface 512 and an annular recess 514 having a diameter smaller than the annular end surface 512 and having a generally planar surface. A plurality of pin receiving holes 516 and locating holes 518 extend through the flange like portion 508 and open into the annular recess 514. When the flow restrictor 486 is being mounted in the housing 432, the securing pins 480 are moved into the pin receiving holes 516 and the locating pins 482 move into the locating holes 518. Heat is then applied to fuse the flow restrictor 486 to the housing 432.

A reinforcing member 520, integral with the end wall 490 and the body portion 488, projects axially outwardly from the end wall 490 and terminates in a generally planar end surface 522 lying in substantially the same plane as the annular recess 514. A central opening 524 extends through the end wall 490 and the reinforcing member 520 and has a generally cylindrical inner surface portion 526 and a generally radially outwardly tapering inner surface portion 528 forming portions of the central opening 524. A pair of spaced apart annular recesses 530 and 532 having tapering surfaces are formed in the generally cylindrical inner surface portion 526. A pair of opposite radially extending passageways 534 and 536 extend between one end 538 of the spiral passageway 496 and the central opening 524 to provide for fluid communication therebetween. The other end 540 of the spiral passageway 496 is in fluid communication with the housing slot 484 so that fluid from the container means 402 may pass through the housing slot 484 into the spiral passageway 496. Reinforcing ribs 542 and 544 are integral with the reinforcing member 520, the body portion 488 and the end wall 490. Two opposed slots 546 and 548 are formed in the inner surface portion 528 and extend past the annular recesses 530 and 532 and terminate at a location between the annular recess 530 and the radially extending passageways 534 and 536 for a purpose described below.

Another part of the dispensing means 420 is illustrated in FIGS. 15 and 23–25 and comprises an actuator rod means 552 mounted for reciprocal movement in the hollow, generally annular member 450. The rod means 552 has a central portion 554 having a plurality of spaced apart radially outwardly projecting continuous annular ribs 556 which contact a generally cylindrical inner surface 558 of the hollow generally annular member 450. The ribs 556 have a diameter slightly greater than the diameter of the inner surface 558 so that the inner surface 558 exerts a radially inwardly directed force thereon so as to provide a fluid tight seal therebetween. The rod means 552 has a front portion 560 having a central member 562 and two separate side members 564 and 566 spaced from the central member 562. The central member 562 has a recess 568 for receiving the force applying portion 462 of the handle means 458 so that movement of the handle means 458 will move the rod means 552. Each of the side members 564 and 566 have a radially outwardly projecting boss 570 and 572 which are mounted for sliding movement in a pair of opposed grooves 574 (FIG. 19), each of which has a radially outwardly directed recess 576 dimensioned to receive one of the bosses 570 or 572 for a purpose to be described below. The greatest distance between the outer surfaces of the bosses 570 and 572 is greater than the greatest distance between the recesses 576 so that the bosses 570 and 572 are resiliently urged into the grooves 574 and, when appropriate, into the recesses 576. The rod means 552 has a hollow rear portion 578 having a plurality of longitudinally extending, radially inwardly projecting splines 580. A radially outwardly directed flange like member 582 projects from the generally cylindrical outer surface 584 of the rear portion 578 to provide an annular planar surface 586 facing the rear edge 588 of the rear portion 578.

Figure 26:
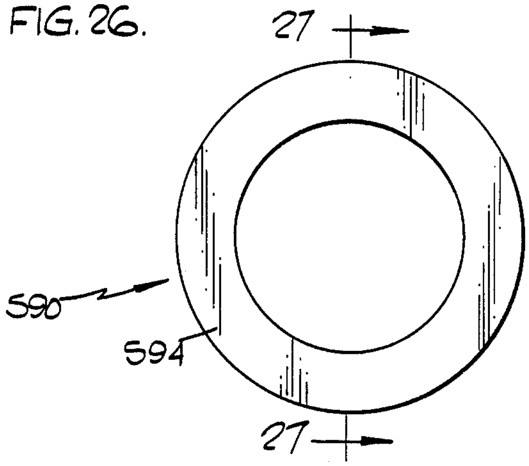
FIG. 26 is a front elevational view of the washer of FIG. 15.
Figure 27:
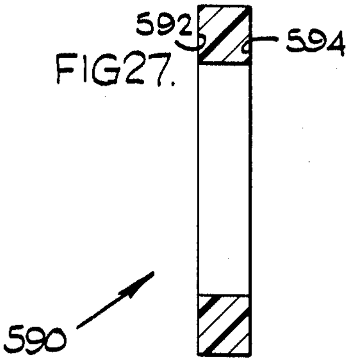
FIG. 27 is a cross-sectional view of FIG. 26 taken on the line 27—27.
Figure 28:
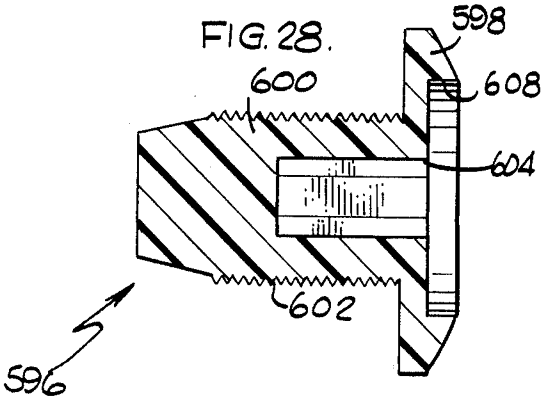
FIG. 28 is a cross-sectional view of the washer retainer of FIG. 15.
Figure 29:
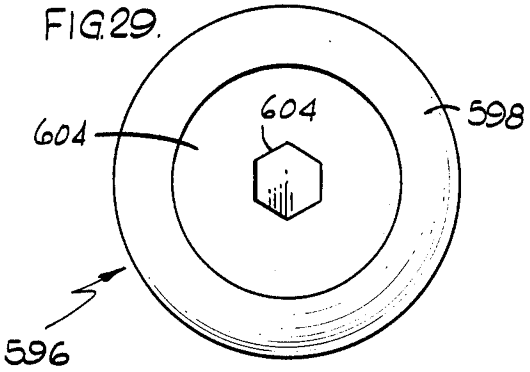
FIG. 29 is a rear elevational view of FIG. 28.

A ring like sealing member 590, FIGS. 26 and 27, formed from a resilient material such as buna N rubber having a durometer of 70 A, has generally planar front and rear surfaces 592 and 594 and an inner diameter only slightly greater than the diameter of the outer surface 584 so that the sealing member 590 may be positioned on the rear portion 578 with the front surface 592 thereof in contact with the annular planar surface 586. The outer diameter of the sealing member 590 is greater than the outer diameter of the flange like member 582 so that a radially outer portion of the sealing member is exposed. A retaining member 596, FIGS. 28 and 29, is provided and has an enlarged head portion 598 and a shank portion 600 having external selftapping threads 602. As illustrated in FIG. 15, the outer diameter of the head portion 598 is substantially the same as the outer diameter of the sealing member 590. A hexagonal recess 604 is provided in the shank portion 600 and is adapted for receiving a similarly shaped tool for use in tightening the retaining member 596. The retaining member 596 is screwed into the rear portion 578 with the threads thereon self tapping into the splines 580 and is tightened so as to clamp the sealing member 590 between the annular planar surface 586 and the head portion 598. As illustrated in FIG. 15, the radially outer portion of the front surface 592 contacts the inner surface 506 of the hollow conical section 448. A coil spring 606, made from stainless steel, is seated in a recess 608 in the head portion 598 and a recess 610 in the end wall 490 and applies a resilient force to the rod means 552 to move the sealing member 590 into contact with the inner surface 506 to prevent entry of fluid into the passageway 612 leading to the nozzle 436.

Figure 30:
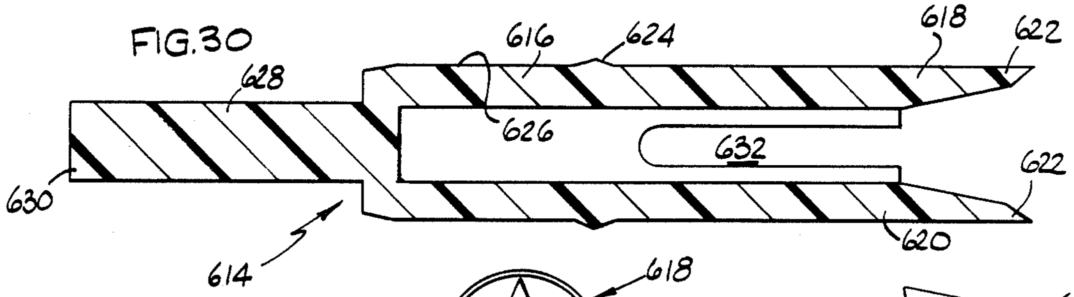
FIG. 30 is an enlarged cross-sectional view of the puncture plug of FIG. 15.
Figure 31:
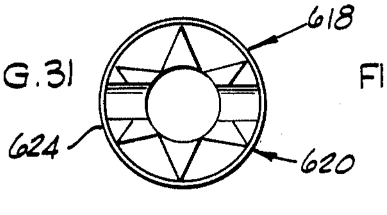
FIG. 31 is a rear elevational view of the puncture plug.
Figure 32:
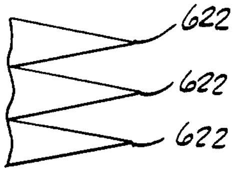
FIG. 32 is a top plan view illustrating the pointed tips.

The puncture plug means 614, illustrated in FIGS. 30–32, has a hollow body portion 616 that is bifurcated at one end thereof to form two end sections 618 and 620. A plurality of pointed tips 622 are formed in the terminal portion of each end section 618 and 620. An annular rib 624 extends radially outwardly from the generally cylindrical outer surface 626 having an outer diameter slightly less than but substantially the same as the inner diameter of the generally cylindrical inner surface 526 of the hollow body portion 616 and is shaped to fit into the annular recesses 530 and 532. An elongated cylindrical portion 628 extends axially outwardly from the hollow body portion 616 and terminates in a tip portion 630, which, as illustrated in FIG. 15, is received in the hexagonal socket 604 of the retaining member 596 so that movement of the actuator rod means 552 will move the elongated rod 626 and therefore the puncture plug means 614 in one direction only as described below. As illustrated in FIG. 15, when the puncture plug means 614 is in the closed position for shipping and storage, the outer surface 626 of the hollow body portion 616 is in contact with the generally cylindrical inner surface 526 on each axial side of the radially extending passageways 534 and 536 to form a sealing means to prevent flow of fluid from the container means through the radially extending passageways 534 and 536. In this closed position, the annular rib 624 is seated in the recess 530 to restrain movement of the puncture plug means 614.

Figure 16:
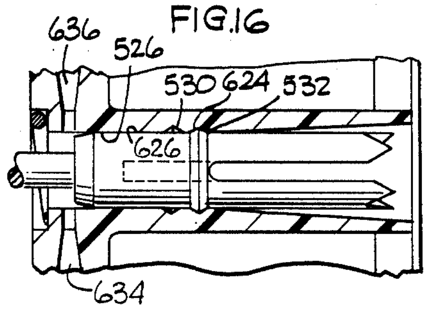
FIG. 16 is a cross-sectional view of a portion of FIG. 15 with parts located so that fluid may be dispensed from the container means.
Figure 17:
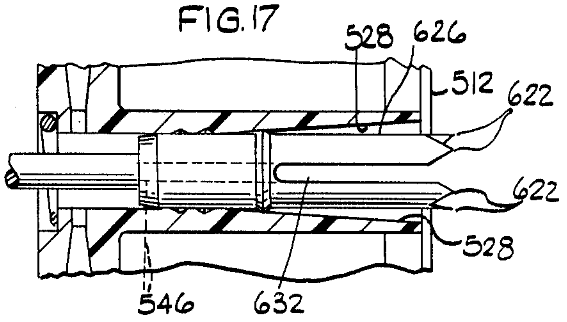
FIG. 17 is a cross-sectional view of a portion of FIG. 15 with parts located in a pouch puncturing position.

The locking means for preventing the movement of handle means 460 is similar to that described above in relation to FIG. 9 and comprises the member 306. When it is desired to dispense fluid for the first time, the stop means 468 is positioned so that the circular outer surface 470 is located to be contacted by the surface 474. The lower portion 312 of the member 306 is grasped and moved axially outwardly so as to break the member 306 away from the handle means 458. The handle means 458 is then rotated so as to move the actuator rod means 552 in a direction toward the right, as illustrated in FIG. 15, so as to move the puncture plug means 614, also to the right, so that the annular rib 624 moves out of the recess 530. Rotation of the handle means 458 is continued until the surface 474 contacts the circular outer surface 470 of the stop means 468 at which time the annular rib 624 will be seated in the recess 532 so as to apply a restraining force to resist movement of the puncture plug means 614. This location of the puncture plug means 614 is illustrated in FIG. 16 which shows that the outer surface 626 is no longer in a sealing position so that fluid may flow from the container means through the radially extending passageways 634 and 636 into the space enclosed by the annular rib 502 so as to be available to flow through the passageway 612 and out of the nozzle means 436 when the actuator rod means 552 is moved to move the sealing member 590 to an open position.

When all of the fluid has been dispensed from the container means 402 as illustrated in FIG. 14, the stop means 468 is rotated until the planar outer surface 472 faces the surface 474. The handle means 458 is rotated so as to move the actuator rod means 552 to the right, as illustrated in FIG. 15, and into contact with the tip portion 630 of the elongated rod 628. Continued rotation of the handle means 458 moves the puncture plug means 614 to the right and forces the annular rib 624 out of the recess 532. Continued rotation of the handle means 458 moves the puncture plug means 614 further to the right until the pointed tips 622 extend axially outwardly beyond the annular end surface 512 and into contact with the expanded pouch means 422. Continued movement of the puncture plug means 614 allows the pointed tips 622 to puncture the expanded pouch means 422 so that the pressurizing gas therein is free to escape. The escaping gas will move into the space 632 between the bifurcated end sections 618 and 620 and into the space between the outer surface 626 and the tapered surface 528 and then through the slots 546 and 548 into the central opening 524 and finally exit through the nozzle means 436. Also, the expandable pouch 422 will rupture so that the escaping gas will also flow through the housing slot 484 and the other end 540 of the spiral passageway into the spiral passageway 496 and out through the nozzle 436. As stated above, when the surface 474 contacts the planar surface 472, the bosses 570 and 572 will move into the recess 576 to prevent further movement in either direction of the actuator rod means 552 to ensure that all of the pressurized gas escapes from the expanded pouch means 422.

In the presently preferred embodiment of the invention, as illustrated in FIG. 15, the dispensing means 420 has an overall length of about 3.0 inches, an outside diameter of the flange like member 442 of about 2.9 inches and the housing 432 has an outer diameter of about 1.63 inches. The pressure in the container means 402 is maintained at between about 18 and 25 psig and fluid is dispensed from the nozzle 436 at the rate of about 0.5 gallons per minute. However, these dimensions are given for illustration purposes only since those skilled in the art will make the dispensing means of any required size to provide a desired service. It is the cooperation between the various structures to accomplish the various functions that provide the inventive concepts of this application. This is also the same in relationship to the material used in the dispensing means. Economic considerations dictate the use of a plastic material as described above but the dispensing means may be formed of other materials, such as metal, and still provide the desired cooperation between the various structures to accomplish the various functions.

While illustrative and presently preferred embodiments of the invention has been described in detail herein, it is to be understood that the inventive concepts may be otherwise variously embodied and employed and that the appended claims are intended to be construed to include such variations except insofar as limited by the prior art.

What is claimed is:

1. Apparatus for use in controlling the dispensing of fluid from a container means which apparatus is secured to and shipped with the container means and for removing pressure from within the container means after substantially all the fluid has been dispensed therefrom comprising:

container means having a fluid contained therein;

fluid dispensing means secured to said container means so that portions of said fluid may be withdrawn from said container means;

sealed expandable pouch means in said container means;

pressure generating means contained within said expandable pouch means and responsive to a reduction in pressure in said container means as said fluid is dispensed therefrom to produce a pressurized gas to inflate said expandable pouch means to increase its volume and apply pressure to said fluid in said container means so that the pressure on said fluid in said container means is maintained within a range of pressures having a preferred high pressure and a preferred low pressure; and pressure removing means, for use after substantially all of said fluid has been dispensed from said container means, for entering into said expandable pouch means to remove said pressurized gas therefrom and for discharging said pressurized gas through said dispensing means so that the pressure within said container means is substantially atmospheric.

2. Apparatus as in claim 1 wherein said dispensing means comprises:

a nozzle on said dispensing means through which portions of said fluid may be withdrawn from said container means;

first wall means forming a first passageway in said dispensing means and having a portion thereof in fluid communicatior with said nozzle;

valve means for opening and closing said first passageway;

resilient means for urging said valve means to a closed position;

second wall means forming a second passageway in said dispensing means extending between said valve means and the interior of said container means;

sealing means for closing said second passageway;

movable means for moving both said valve means and said sealing means in one direction to an open position to open said first and second passageways so that fluid may flow through said first and second passageways and be withdrawn from said container means through said nozzle;

first retaining means for holding said sealing means in said closed position during shipping or storage; and second retaining means for holding said sealing means in said open position while permitting normal operation of said valve means so that portions of said fluid can be periodically dispensed through said valve means and said nozzle means until substantially all of said fluid is dispensed from said container means.

3. Apparatus as in claim 2 and further comprising:

locking means for preventing movement of said movable means until said locking means are removed; and said locking means also providing tamper proof indicating means.

4. Apparatus as in claim 2 wherein:

said pressure removing means moves with said sealing means.

5. Apparatus as in claim 4 and further comprising:

adjustable movement limiting means having one position for limiting the movement of said movable means to said open position of said first and second passageways and another position for permitting movement of said pressure removing means into said expandable pouch means.

6. Apparatus as in claim 5 wherein said movable means to open said first and second passageways comprises:

rod means mounted for reciprocal movement in said first passageway;

handle means mounted on said dispensing means and positioned in said rod means so that movement of said handle means causes movement of said rod means;

and said sealing means comprises a member extending from and integral with a portion of said second wall means and having a centrally located opening extending therethrough, said centrally located opening having a generally cylindrical inner surface;

fluid communication means in said member for providing fluid communication between said centrally located opening and at least a portion of said second passageway;

a movable member mounted for linear movement in said centrally located opening;

at least a portion of said movable member having a generally cylindrical outer surface having a diameter substantially the same as the diameter of said inner surface;

said movable member providing said sealing means for closing said second passageway when said at least a portion of said movable member is positioned between said fluid communication means and said centrally located opening; and abutment means between said movable member and said rod means so that movement of said rod means in said one direction will move said movable member in the same direction but movement of said rod means in the opposite direction will not move said movable member.

7. Apparatus as in claim 6 wherein said valve means comprises:

valve seat means formed at the end of said first passageway closer to said second passageway;

valve sealing means comprising an annular ring shaped member;

mounting means for mounting said valve sealing means on said rod means so that movement of said rod means will move said valve sealing means out of and into contact with said valve seat means so as to open and close said first passageway.

8. Apparatus as in claim 7 wherein said mounting means for said valve sealing means comprises:

an annular flange projecting outwardly from said rod means and having a surface facing said second passageway;

said valve sealing means mounted on said rod means so that at least a portion of said valve sealing means is in contact with said surface; and pressure applying means threadedly mounted in said rod means and having at least a portion thereof in contact with said valve sealing means so as to clamp said valve sealing means between said surface and said pressure applying means.

9. Apparatus as in claim 6 wherein said first and second retaining means comprises:

a first annular recess having tapered adjoining walls formed in said generally cylindrical inner surface;

a second annular recess having tapered adjoining walls formed in said generally cylindrical inner surface and spaced from said first annular recess in an axial direction toward said fluid in said container means respectively;

an annular projection having tapered adjoining walls on said generally cylindrical outer surface;

said annular projection being seated in said first annular recess when said sealing means are in a closed position; and said annular projection being moved out of said first annular recess and into said second annular recess when said sealing means are moved to said open position.

10. Apparatus as in claim 6 wherein said adjustable movement limiting means comprises:

rotatable stop means rotatably mounted in said dispensing means and located so that movement of said handle means will move at least a portion of said handle means into contact with said rotatable stop means and prevent further movement of said handle means;

said rotatable stop means having a first surface for limiting movement of said handle means so that said handle means will move said sealing means only to said open position of said second passageway; and said rotatable stop means having a second surface for permitting movement of said handle means to move said pressure removing means into said expandable pouch means.

11. Apparatus as in claim 10 and further comprising:

said centrally located opening having an axially extending, radially outwardly tapering inner surface located between said generally cylindrical inner surface and said fluid in said container means;

said centrally located opening terminating with an end edge portion facing said fluid in said container means;

at least two opposed grooves in said tapering inner surface and said generally cylindrical inner surface extending from said end edge portion to a location between said first annular recess and said fluid communication means in said member;

said pressure removing means comprising pointed tips on said movable member; and said fully expanded expandable pouch means being in contact with said end edge portion when substantially all of said fluid has been dispensed from said container means so that said pointed tips will rupture said fully expanded expandable pouch means when said movable member has been moved to said pressure removing position and at least some of the pressurizing gas will move through said opposed grooves and out through said nozzle means.

12. Apparatus as in claim 11 and further comprising:

locking means for locking said movable means in the pressure removing position after said pressure removing means has moved into said expandable pouch means.

13. Apparatus as in claim 12 wherein said locking means comprises:

a pair of opposed channels in said first passageway;

a pair of bosses on opposite sides of said rod means and located so that one boss is in each of said channels;

resilient means for resiliently urging each of said bosses into each of said channels;

a recess formed in each of said channels;

said recess having a cross-sectional configuration corresponding to the cross-sectional configuration of each of said bosses so that each boss will be resiliently urged into said recess; and said recesses being located in said first passageway so that bosses will be in said recesses when said pressure removing means has been moved into said expandable pouch means.

14. A method for use in controlling the dispensing of a fluid from a container using dispensing means which are secured to and shipped with the container comprising:

providing container means having an opening therein and through which fluid may be introduced into said container means;

introducing fluid into said container means through said opening;

inserting a self-generating pressure means into said container means for applying a constant pressure on said fluid in said container means;

securing a fluid dispensing means in said opening so that said opening is sealed by said fluid dispensing means;

forming a first passageway passing through said dispensing means;

connecting a nozzle to one end of said first passageway;

providing said dispensing means with valve means for opening and closing said first passageway;

forming a second passageway in said dispensing means extending between said valve means and the interior of said container means;

sealing said second passageway between said valve means and the interior of said container means with movable means to prevent the movement of fluid from said container means through said second passageway;

opening said first and second passageways by movement in one direction of said valve means and said movable means so that fluid may flow out of said container means through said first and second passageways and be withdrawn from said container means through said nozzle; and locking said movable means in the open position so that said second passageway is permanently open while permitting normal operation of said valve means.

15. Apparatus for use in controlling the dispensing of a fluid from a container which apparatus is secured to and shipped with the container comprising:

container means having a fluid contained therein;

self-generating pressure means in said container means for applying a pressure on said fluid in said container within a desired range of pressures;

fluid dispensing means secured to said container means so that portions of said fluid may be withdrawn from said container means;

a nozzle on said dispensing means through which portions of said fluid may be withdrawn from said container means;

means forming a first passageway in said dispensing means and having a portion thereof in fluid communication with said nozzle;

valve means for opening and closing said first passageway;

resilient means for urging said valve means to a closed position;

wall means forming a second passageway in said dispensing means extending between said valve means and the interior of said container means;

sealing means for closing said second passageway;

movable means for moving both said valve means and said sealing means in one direction to an open position to open said first and second passageways so that fluid may flow through said first and second passageways and be withdrawn from said container means through said nozzle, and retaining means for holding said sealing means in said open position while permitting operation of said valve means to open and close said first passageway so that fluid can be substantially completely dispensed from said container.

16. Apparatus as in claim 15 and further comprising:

means for securing said dispensing means to said container with a fluid tight seal between said securing means, said dispensing means and said container;

said wall means comprising a hollow housing connected to said valve means and a member within said hollow housing;

said hollow housing having an inner cylindrical surface;

said member having at least one opening therein leading to means for reducing the pressure on said fluid as it moves through said second passageway associated therewith for the flow of fluid therethrough mounted in said housing;

at least one opening in said housing so that fluid from inside said container may flow through said at least one opening in said housing, through said at least one opening in said member and into said means for reducing the pressure associated with said member;

said at least one opening of said housing and said member, and said means for reducing the pressure constituting said second passageway; said sealing means comprising said member located relative to said housing so that said at least one opening in said member and said at least one opening in said housing are out of alignment so that fluid may not flow out of said container through said openings;

said sealing means being in an open position when moved by said movable means whereby said member relative to said housing is in a position wherein said at least one opening in said member is in alignment with said at least one opening in said housing so that fluid may flow through said openings in said housing and in said member into said means for reducing the pressure associated with said member and into a space adjacent to said valve means for opening and closing said first passageway leading to said nozzle;

said means for reducing the pressure comprising:

a spiral rib forming the outer surface of a major portion of said member;

said spiral rib being in contact with said inner cylindrical surface of said housing to form a spiral channel therebetween, and said spiral channel comprising a portion of said second passageway;

one end of said spiral channel being in fluid communication with said at least one opening in said member and hollow housing and and the other end of said spiral channel being in fluid communication with said space adjacent to said valve means for opening and closing said first passageway leading to said nozzle; and said spiral channel between said member and said housing affecting said fluid flowing therethrough so that the pressure on said fluid in said space is less than the pressure on said fluid within said container when fluid is being dispensed from said container.

17. Apparatus as in claim 15 and further comprising:

means for securing said dispensing means to said container with a fluid tight seal between said securing means, said dispensing means and said container;

said wall means comprising a hollow housing connected to said valve means and a member within said hollow housing;

said member having at least one opening therein leading to a portion of said second passageway associated therewith for the flow of fluid therethrough mounted in said housing;

at least one opening in said housing so that fluid from inside said container may flow through said at least one opening in said housing, through said at least one opening in said member and into the portion of said second passageway associated with said member;

said sealing means comprising said member located relative to said housing so that said at least one opening in said member and said at least one opening in said housing are out of alignment so that fluid may not flow out of said container through said openings;

said sealing means being in an open position when moved by said movable means whereby said member relative to said housing is in a position wherein said at least one opening in said member is in alignment with said at least one opening in said housing so that fluid may flow through said openings in said housing and in said member into said portion of said second passageway associated with said member and into a space adjacent to said valve means for opening and closing said first passageway leading to said nozzle;

a hollow extension on said housing;

said nozzle being located on said hollow extension and having an outlet in fluid communication with the interior of said hollow extension;

said movable means comprising a rod mounted for reciprocal movement in said hollow extension;

one end of said rod being in fluid tight but movable relationship with a portion of the inner surface of said hollow extension;

said valve means comprising the other end of said rod;

a portion of said rod forming a space between said rod and other portions of the inner surface of said hollow extension in fluid communication with said nozzle;

said space between said rod and said other portions being in fluid communication with said first passageway leading to said nozzle when said valve means for opening and closing said first passageway leading to said nozzle are in an open position;

means for controlling the movement of said rod so as to control the size of said first passageway between said other end of said rod and said other portions of the inner surface of said hollow extension;

a flow modulator rotatably mounted on the one end of said rod;

means for preventing movement of said flow modulator in a linear direction parallel to the longitudinal axis of said flow modulator;

a first annular cam surface on said flow modulator;

a second annular cam surface on the end of said hollow extension on said housing facing said first annular cam surface on said flow modulator; and said flow modulator being rotated so that the distance between said first and second annular cam surfaces controls the distance that said rod may be moved so as to control the size of said first passageway between said rod and said other portions of the inner surface of said hollow extension.

18. Apparatus as in claim 15 and further comprising:

means for securing said dispensing means to said container with a fluid tight seal between said securing means, said dispensing means and said container;

said wall means comprising a hollow annular housing having at least one opening at one end thereof and a member within said hollow housing;

an end wall at the other end of said housing;

means defining an aperture in said end wall;

said movable means comprising a rod mounted in said aperture for reciprocal movement therein and means for moving said rod;

a groove formed in said rod;

sealing means in said groove for forming a fluid tight seal between said means defining an aperture and said rod;

a partition in said housing in fluid tight engagement therewith;

means defining a central opening in said partition;

said rod passing through said central opening in said partition;

said member having at least one opening therein leading to a portion of said second passageway associated therewith for the flow of fluid therethrough mounted in said housing;

said sealing means comprising said member located relative to said housing so that said at least one opening in said member and said at least one opening in said housing are out of alignment so that fluid may not flow out of said container through said openings;

said sealing means being in an open position when moved by said movable means whereby said member relative to said housing is in a position wherein said at least one opening in said member is in alignment with said at least one opening in said housing so that fluid may flow through said at least one opening in said housing and in said member, into said portion of said second passageway associated with said member and into a space adjacent to said valve means for opening and closing said first passageway leading to said nozzle;

said valve means comprising resilient sealing means connected to said rod and said member and normally urged into contact with said means defining said central opening in said partition to form a fluid tight seal between said means defining said central opening in said partition and the interior of said container; whereby operation of said means for moving said rod moves said rod to move said resilient sealing means out of contact with said means defining said central opening so that fluid may be dispensed from said container.

19. Apparatus as in claim 15 and further comprising:

means for securing said dispensing means to said container with a fluid tight seal between said securing means, said dispensing means and said container;

said wall means comprising a hollow annular housing having one end thereof open to the interior of said container and a annular flow restrictor;

said dispensing means located at the other end of said housing;

said hollow annular flow restrictor having a spiral rib formed on the outer surface thereof;

said flow restrictor being mounted within said hollow annular housing with said spiral rib adjacent to the inner surface of said hollow annular housing so as to form a spiral passageway having one end open to the interior of said container;

said flow restrictor having one end thereof open to the interior of said container;

an end wall at the other end of said flow restrictor;

said second passageway comprising a central annular opening in said end wall, and at least one radially extending passageway in said end wall; said radially extending passageway extending between said spiral passageway and said central opening, said radially extending passageway having an opening into said spiral passageway and an opening into said central opening;

said central opening being in fluid communication with said first passageway leading to said nozzle; and said sealing means closing said opening between said spiral passageway and of said radially extending passageway into said central opening.

20. Apparatus for use in controlling the dispensing of a fluid from a container which apparatus is secured to and shipped with the container comprising:

container means having a fluid contained therein;

self-generating pressure means in said container means for applying a constant pressure on said fluid in said container;

fluid dispensing means secured to said container means;

a nozzle on said dispensing means through which portions of said fluid may be withdrawn from said container means;

means forming a first passageway in said dispensing means and having a portion thereof connected to said nozzle;

valve means for opening and closing said first passageway;

resilient means for urging said valve means to a closed position;

means forming a second passageway in said dispensing means extending between said valve means and the interior of said container means;

first sealing means for closing said second passageway;

moveable means for moving both said valve means and said first sealing means in one direction to an open position to open said first and second passageways so that fluid may flow through said first and second passageways and be withdrawn from said container means through said nozzle; and retaining means for permanently holding said first sealing means in said open position while permitting normal operation of said valve means, said retaining means comprising a projection means on said first sealing means and a corresponding recess means which lockingly engages said projection means.

21. Apparatus as in claim 20 wherein said movable means comprises:

rod means mounted for reciprocal movement in said means forming said first passageway;

handle means mounted on said dispensing means and connected to said rod means so that movement of said handle means causes movement of said rod means;

said means forming said first passageway having an open end at a location remote from said connection between said handle means and said rod means; and said valve means comprising second sealing means on said rod for opening or closing said open end of said means forming said first passageway in response to the reciprocal movement of said rod.

22. Apparatus as in claim 21 and further comprising:

locking means for locking said rod means in a closed position during shipment of said container means.

23. Apparatus as in claim 21 and further comprising:

a hollow, annular member connected to said means defining said first passageway at said open end thereof;

said hollow, annular member having a generally cylindrical inner surface;

flow control means secured to said inner surface of said hollow, annular member;

a first portion of said flow control means comprising an annular partition in sealing relationship with said inner surface of said hollow, annular member;

a central cylindrical bore formed in said annular partition;

a radially extending passageway in said annular partition and having one end opening into said central cylindrical bore;

a second portion of said flow control means comprising a hollow, annular extension projecting axially from said annular partition;

said annular extension having a generally cylindrical outer surface;

an outwardly opening spiral groove in said outer surface with the edges of said spiral groove in contact with said inner surface of said hollow, annular member and forming a flow restricting passageway therebetween so as to reduce the pressure on fluid flowing therethrough;

a first end of said spiral groove in fluid communication with said fluid in said container and a second end of said spiral groove in fluid communication with the other end of said radially extending passageway; and said first sealing means being located in said central cylindrical bore.

24. Apparatus as in claim 21 and further comprising:

flow control means for acting of said fluid during movement through said second passageway so as to reduce the pressure on said fluid.

25. Apparatus as in claim 24 wherein said flow control means comprises:

a spiral, closed passageway having a first end in fluid communication with said fluid in said container and a second end in contact with and sealed by said first sealing means during shipment of said container means.

26. Apparatus as in claim 24 wherein said flow control means comprises:

a spiral, closed passageway having a first end in fluid communication with said first passageway and a second end in contact with and sealed by said first sealing means during shipment of said container means.

27. Apparatus as in claim 24 and further comprising:

flow modulating means mounted on said rod means for limiting said movement of said rod to an open position so as to control the capacity of the flow of fluid through said nozzle.

28. Apparatus as in claim 24 and further comprising:

locking means for locking said rod means in a closed position during shipment of said container means.

29. Apparatus for use in controlling the dispensing of a fluid from a container which apparatus is secured to and shipped with the container comprising:

container means having a fluid contained therein;

self-generating pressure means in said container means for applying a pressure on said fluid in said container within a desired range of pressures;

fluid dispensing means secured to said container means so that portions of said fluid may be withdrawn from said container means;

nozzle means on said dispensing means through which portions of said fluid may be withdrawn from said container means;

first wall means forming a first passageway in said dispensing means and having a portion thereof in fluid communication with said nozzle means;

valve means for opening and closing said first passageway;

resilient means for urging said valve means to a closed position;

second wall means forming a second passageway in said dispensing means extending between said valve means and the interior of said container means;

sealing means for closing said second passageway;

movable means for moving both said valve means and said sealing means in one direction to an open position to open said first and second passageways so that fluid may flow through said first and second passageways and be withdrawn from said container means through said nozzle means; and retaining means for retaining said sealing means in said open position while permitting normal operation of said valve means so that portions of said fluid can be periodically dispensed through said valve means and said nozzle means until substantially all of said fluid is completely dispensed from said container means.

30. Apparatus as in claim 29 wherein said sealing means and said retaining means comprise:

a member extending from and integral with a portion of said second wall means and having a central opening extending therethrough, said central opening having a generally cylindrical inner surface;

an opening in said second wall means in fluid communication with said central opening;

an annular recess having tapered adjoining walls formed in said generally cylindrical inner surface;

a hollow movable member, comprising a portion of said sealing means, mounted for linear movement in said central opening and formed from a material having a natural characteristic to resile;

at least a portion of said movable member having a generally cylindrical outer surface having a diameter substantially the same as the diameter of said generally cylindrical inner surface and closing said opening when said sealing means are in a closed position;

an annular projection having tapered adjoining walls on said generally cylindrical outer surface;

said annular projection being seated in said annular recess when said sealing means are in a closed position; and said annular projection being moved out of said annular recess and into contact with said generally cylindrical inner surface when said sealing means are moved to an open position so that a radially inwardly directed force is being applied to said annular projection to retain said sealing means in said open position.

31. Apparatus as in claim 29 wherein said movable means comprises:

rod means mounted for reciprocal movement in said means forming said first passageway;

handle means mounted on said dispensing means and connected to said rod means so that movement of said handle means causes movement of said rod means;

said means forming said first passageway having an open end at a location remote from said connection between said handle means and said rod means; and said valve means comprises second sealing means on said rod for opening or closing said open end of said means forming said first passageway in response to the reciprocal movement of said rod.

32. Apparatus as in claim 31 and further comprising:

locking means for locking said handle means and therefore said rod means in a closed position during shipment of said container means and providing an indication that said container means has not been tampered with.

33. Apparatus as in claim 32 and further comprising:

flow control means for acting on said fluid during movement through said second passageway so as to reduce the pressure on said fluid.

34. Apparatus as in claim 33 wherein said flow control means comprises:

a spiral, closed passageway having a first end in fluid communication with said fluid in said container and a second end in contact with and sealed by said first sealing means during shipment of said container means.

* * * * *